United States Patent
Hirano et al.

(10) Patent No.: US 7,094,853 B2
(45) Date of Patent: Aug. 22, 2006

(54) CROSSLINKED POLYMER, METHOD FOR MANUFACTURING IT AND USE THEREOF

(75) Inventors: Yoshiaki Hirano, Nishinomiya (JP); Hiroshi Yamamoto, Kobe (JP); Takehiko Morita, Ibaraki (JP); Takafumi Kubo, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 424 days.

(21) Appl. No.: 10/283,314

(22) Filed: Oct. 30, 2002

(65) Prior Publication Data

US 2004/0087727 A1 May 6, 2004

(51) Int. Cl.
*C08F 12/28* (2006.01)

(52) U.S. Cl. ..................... 526/310; 525/328.4
(58) Field of Classification Search .............. 525/328.4; 526/310
See application file for complete search history.

(56) References Cited

U.S. PATENT DOCUMENTS

| | | | |
|---|---|---|---|
| 3,716,481 A | 2/1973 | Battaerd | |
| 3,891,576 A | 6/1975 | Battaerd et al. | |
| 3,941,724 A | 3/1976 | Bolto | |
| 4,788,267 A * | 11/1988 | Chiao et al. | 526/287 |
| 2002/0028887 A1 | 3/2002 | Yoshiaki et al. | |

FOREIGN PATENT DOCUMENTS

| | | |
|---|---|---|
| EP | 0 841 350 A1 | 5/1998 |
| EP | 0 970 937 A1 | 1/2000 |
| EP | 1 022 058 A1 | 7/2000 |
| JP | 49-31631 | 8/1974 |

* cited by examiner

*Primary Examiner*—Bernard Lipman

(57) ABSTRACT

It is an object of the present invention to provide a basic crosslinked polymer having excellent ion exchange and catalyst properties with high resistance to thermal degradation which is, therefore, useful for a broad range of application, a method for producing said crosslinked polymer with great ease and high efficiency, and methods of using said crosslinked polymer.

A crosslinked polymer having a tertiary amine and/or a quaternary ammonium salt structure, said crosslinked polymer has a tertiary amine structure at either end of at least one crosslink structure.

3 Claims, No Drawings

CROSSLINKED POLYMER, METHOD FOR MANUFACTURING IT AND USE THEREOF

BACKGROUND OF THE INVENTION

Technical Field

The present invention relates to a crosslinked polymer as well as a method for producing the same and a method for using the same.

BACKGROUND TECHNOLOGY

Basic crosslinked polymers may exhibit ion exchange activity and active hydrogen-activating catalyst activity and, as such, are in broad use in a variety of industrial applications such as strong base anion exchange resins and resin catalysts. As such crosslinked polymers, styrene-type strong base anion exchange resins such as styrene-diviylbenzene copolymers are generally known.

Such styrene-type strong base anion exchange resins are generally produced by suspension polymerizing styrene and divinylbenzene to thereby synthesize a crosslinked polystyrene-divinylbenzene, which is a crosslinking product-derived from a styrene-divinylbenzene copolymer, in a spherical form, then chloromethylating this crosslinked polymer using a Lewis acid, for instance, and causing a tertiary amine or the like to add thereto to thereby introduce an amine structure thereinto. Such strong base anion exchange resins can be involved in ion exchange reactions in the whole pH range and therefore are utilized in a wide range of applications.

In such strong base anion exchange resins, the nitrogen atom in the amine structure resulting from introduction of a tertiary amine or the like into the crosslinked polymer, namely the nitrogen atom in the tertiary amine-derived quaternary ammonium salt (OH form), is the main site contributing to the ion exchange capacity or catalytic activity. For strongly basic crosslinked polymers, it is therefore very important that such sites, namely the so-called active sites, are retained stably so that the function thereof can be performed continuously with good durability. However, when styrene-type strong base anion exchange resins are used at an elevated temperature not lower than 40° C., a problem is encountered, namely insufficient resistance to thermal degradation as a result of elimination or decomposition of the amine structure due to ready thermal decomposability of the quaternary ammonium salt from the chemical structure viewpoint, which leads to a reduction in performance. To cope with such a problem, it is a current practice to render the amine structure less eliminable by selecting a chloromethylating agent as a spacer or increase the molecular weight of the resin to thereby increase the introduction of the amine structure in excess of a certain level. Essentially, however, these measures cannot render the quaternary ammonium salt resistant to thermal degradation, hence cannot improve the resistance of strong base anion exchange resins to thermal degradation to a satisfactory extent. Therefore, the advent of a technology has been awaited by which the active sites contributing to the ion exchange capacity or catalytic activity can be essentially rendered resistant to thermal degradation and by which crosslinked polymers widely usable in various applications as strong base anion exchange resins, for instance, and a method for producing the same can be developed and established.

SUMMARY OF THE INVENTION

The present invention, developed in light of the above state of the art, has for its object to provide a basic crosslinked polymer having excellent ion exchange and catalyst properties with high resistance to thermal degradation which is, therefore, useful for a broad range of application, a method for producing said crosslinked polymer with great ease and high efficiency, and methods of using said crosslinked polymer.

After intensive studies done on basic crosslinked polymers for accomplishing the above object, the inventors of the present invention found that a crosslinked polymer having a tertiary amine structure and/or a quaternary ammonium salt structure together with a tertiary amine structure at either terminus of at least one crosslink structure exhibits a large ion exchange capacity as well as high catalyst activity for active hydrogen-activating reactions with good resistance to thermal degradation, thus being of great industrial use.

In addition, after intensive studies on the technology of producing such a crosslinked polymer, the inventors found that a production method including a crosslinking step which comprises causing a crosslinking agent to act upon a reactant solution containing a high molecular compound having a specified structure is advantageous and that when (I) such a reactant solution containing a high molecular compound is a solution prepared by suspending said compound in an inert organic solvent, that is to say the production method includes a step of suspending said high molecular compound in an inert organic solvent, the objective crosslinked polymer having the above-mentioned properties can be easily produced. It was also found that when (II) the concentration of said high molecular compound in the reactant solution is judiciously specified, (III) the molecular weight of said high molecular compound is judiciously specified, and/or (IV) the proportion of a given repeating unit in said high molecular compound is judiciously specified, it is not only possible to produce the objective crosslinked polymer as easily as in the case of said process (I) but also with the advantage that the apparent specific gravity of the crosslinked polymer can be increased and, hence, the number of active sites contributory to ion exchange capacity and catalyst activity can be increased to improve the performance characteristics of the polymer and, at the same time, the amine structures serving as such active sites can be made into chemical structures resistant to thermal degradation so that a crosslinked polymer having high resistance to thermal degradation can be produced. Furthermore, it was found that when any of the above processes further comprises a step in which the high molecular compound-crosslinked with the crosslinking agent is washed with a polar solvent, there can be obtained a crosslinked polymer still further improved in ion exchange capacity and catalyst activity and having sufficient strength.

A crosslinked polymer having such excellent properties can also be obtained by a process which comprises suspending a monomer comprising a monomer having a specified structure and a crosslinking monomer in an inert organic solvent and copolymerizing them just as in the processes described above.

The inventors further found that the crosslinked polymer so obtained can be used in a variety of applications, for example ion exchange reaction and activation catalysts for activating the active hydrogen atom in active hydrogen-containing compounds, among others, and have perfected the present invention.

Thus, the present invention is related to a crosslinked polymer having a tertiary amine and/or a quaternary ammonium salt structure, said crosslinked polymer has a tertiary amine structure at either end of at least one crosslink structure.

DISCLOSURE OF THE INVENTION

The present invention is now described in detail.

In this specification, the term "apparent specific gravity" as used with reference to any given solvent means the value calculated by means of the following equation.

Apparent specific gravity (g/mL)={dry weight of resin (x g)}/{volume of swollen resin (VmL)}

In the above equation, the "volume of swollen resin" means the volume determined by placing a dry resin sample in a measuring cylinder, pouring a desired solvent on top of it, and reading the scale of the cylinder when the volume of swollen resin has become steady.

The "apparent specific gravity" serves as an indicator of both the ion exchange capacity and the number of active sites contributory to catalyst activity per unit volume of the crosslinked polymer; then, the larger the apparent specific gravity value is, the greater is the number of active sites per unit volume of the crosslinked polymer and the greater are the ion exchange capacity and catalyst activity of the crosslinked polymer.

The "thermal degradation resistance" is a quality parameter relevant to the thermal degradation temperature of the crosslinked polymer. For example, that the crosslinked polymer has a higher or improved thermal degradation resistance means that the thermal degradation temperature of the particular crosslinked polymer is higher than that of the standard prior art crosslinked polymer. The thermal degradation temperature of the crosslinked polymer means the endothermic peak derived from decomposition of the crosslinked polymer as observed on a thermogravimetric-differential thermal analysis (TG-DTA) curve generated by heating the crosslinked polymer in a nitrogen gas atmosphere at a constant rate of 5° C./min using a TG-DTA apparatus. The thermal degradation temperature of the crosslinked polymer according to the present invention is preferably not below 300° C.

The crosslinked polymer of the present invention is a polymer having a structure formed as a high molecular compound having a tertiary amine structure and/or a quaternary ammonium salt structure is crosslinked with a crosslinking agent so as to generate a tertiary amine structure at either end of at least one crosslink structure. Moreover, insofar as it has such a structure, the crosslinked polymer of the present invention is not particularly restricted to a crosslinked substance formed from a high molecular compound and a crosslinking agent. The preferred form of such a crosslinked polymer is a strongly basic crosslinked resin. The tertiary amine structures and/or quaternary ammonium salt structures in the crosslinked polymer, in the use of the polymer in an ion exchange reaction, function as ion exchange groups and, when the polymer is used in a reaction for activation of active hydrogen, function as catalyst sites. The thermal degradation resistance of the crosslinked polymer of the present invention has been remarkably improved because of the above-described crosslink structure. Thus, because the crosslink site of the crosslinked polymer of the present invention is constituted by cyclic structures, said amine structures are hardly eliminable even at high temperature, thus leading to an improved resistance to thermal degradation.

The tertiary amine structure or quaternary ammonium salt structure referred to above is preferably a cyclic amine structure or cyclic quaternary ammonium salt structure. Such cyclic structures are generally known to be less susceptible to oxidative degradation than aliphatic amine structures and are responsible for the structural superiority of the crosslinked polymer of the present invention in thermal degradation resistance. Furthermore, the crosslinked polymer of the present invention preferably has a quaternary ammonium salt structure derived from a diallyldimethylammonium salt. This structure corresponds to a structure such that, referring to the general formula (2) presented hereinafter, $R^{15}$ and $R^{16}$ each represents a methyl group and $R^{17}$ and $R^{18}$ each represents a hydrogen atom.

The amount of said tertiary amine structure or quaternary ammonium salt structure in the crosslinked polymer and the amount of said crosslink structure having a tertiary amine structure at either end can be freely modified according to the desired degree of ion exchange capacity or active hydrogen-activating catalyst activity and resistance to thermal degradation but in order that these functional parameters may be enhanced, the proportion of said "crosslink structure having a tertiary amine structure at either end" is preferably as large as possible and it is most desirable that all the crosslink structures have tertiary amine structures at either end.

The crosslink structure mentioned above is a structure resulting from the intramolecular or intermolecular crosslinking of the high molecular compound by the crosslinking agent and it comprises crosslink sites (A) each having a trifurcate (3-branch) structure located at either end of the said structure and an intermediate site (B) located between said crosslink sites (A) each having a trifurcate structure. For example, the crosslink structure having a tertiary amine structure at either end means a structure representing a combination of a cyclic structure having a tertiary amine structure at either end (a nitrogen-containing heterocycle) and a structure derived from the crosslinking agent and linking together such cyclic structures located at both ends of the structure. In the present invention, it is sufficient that the both termini of at least one crosslink structure have tertiary amine structures. The tertiary amine structure in this context means any chemical structure resulting from direct bonding of three carbon atoms to a nitrogen atom.

The three carbon atoms attached directly to the nitrogen atom forming said tertiary amine structure may each constitute part of the high molecular compound forming the crosslinked polymer or at least one (usually only one) of said carbon atoms may be derived from the crosslinking agent to be described hereinafter.

As the crosslink structure of the crosslinked polymer according to the present invention, the structure represented by the general formula (1):

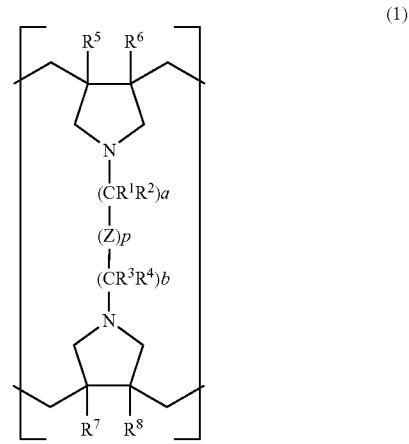

(1)

wherein $R^1$, $R^2$, $R^3$ and $R^4$ are the same or different and each represents a hydrogen atom, a halogen atom, an alkyl group containing 1 to 10 carbon atoms, or a hydroxyl group; $R^5$, $R^6$, $R^7$ and $R^8$ are the same or different and each represents a hydrogen atom, a halogen atom, a methyl group, or an ethyl group; a and b are the same or different and each represents an integer of 0 to 10; and p represents 0 or 1; with the proviso that the relation $a+b+p \geq 1$ is satisfied; Z represents an —NH—, —N(CH$_3$)—, 1,4—piperazinylene, —NH—(CH$_2$)$_3$—NH—, —NH—(CH$_2$)$_4$—NH—, —O—, —O—(CH$_2$)$_2$—O—, —O—CH$_2$—C(CH$_3$)$_2$—CH$_2$—O—, —O—(CH$_2$)$_2$—(O—CH$_2$—CH$_2$)$_{n1}$—O—, 3-methyl—2,6-pyridyl, 4-methyl-2,6-pyridyl, 2,6-pyridyl, 2,5-pyridyl, or —CH(OH)—: n1 represents an integer of not less than 0, is preferred.

The crosslinked polymer essentially having a crosslink structure represented by the above general formula (1) is one of the preferred forms of the present invention.

Referring, further, to the structure represented by the above general formula (1), the two nitrogen-containing heterocycles correspond to said crosslink sites (A) and the structure intermediate between the nitrogen atoms of the two nitrogen-containing heterocycles corresponds to said site (B).

In the above general formula (1), $R^1$, $R^2$, $R^3$ and $R^4$ are the same or different and each represents a hydrogen atom, a halogen atom, an alkyl group containing 1 to 10 carbon atoms, or a hydroxyl group, with the hydrogen atom being preferred. The halogen atom is not particularly restricted but includes, among others, fluorine, chlorine, bromine and iodine. The preferred alkyl group containing 1 to 10 carbon atoms includes, among others, methyl, ethyl, n-propyl, isopropyl, n-butyl, isobutyl, tert-butyl, pentyl, hexyl, heptyl, octyl, nonyl and decyl.

$R^5$, $R^6$, $R^7$ and $R^8$ are the same or different and each represents a hydrogen atom, a halogen atom, a methyl group, or an ethyl group, with the hydrogen atom being preferred. The halogen atom may for example be chlorine, bromine or iodine.

Referring further to the above formula (1), a and b are the same or different and each represents an integer of 0 to 10 and p is equal to 0 or 1; provided, however, that the relation of $a+b+p \geq 1$ is satisfied.

Z represents an —NH—, —N(CH$_3$)—, 1,4—piperazinylene, —NH—(CH$_2$)$_3$—NH—, —NH—(CH$_2$)$_4$—NH—, —O—, —O—(CH$_2$)$_2$—O—, —O—CH$_2$—C(CH$_3$)$_2$—CH$_2$—O—, —O—(CH$_2$)$_2$—(O—CH$_2$—CH$_2$)$_{n1}$—O—, 3-methyl-2, 6-pyridyl, 4-methyl-2, 6-pyridyl, 2, 6—pyridyl or 2,5-pyridyl or —CH(OH)—:

n1 represents an integer of not less than 0.

The 1,4-piperazinylene group mentioned above is a group represented by the following formula (7); said 3-methyl-2, 6-pyridyl group is a group represented by the following formula (8); said 4-methyl-2,6-pyridyl group is a group represented by the following formula (9); said 2,6-pyridyl group is a group represented by the following formula (10); and said 2,5-pyridyl group is a group represented by the following formula (11).

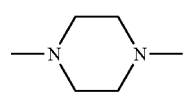

(7)

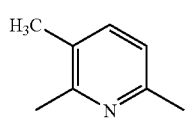

(8)

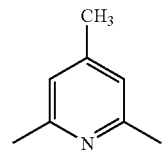

(9)

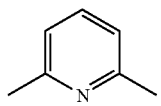

(10)

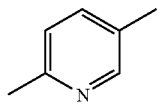

(11)

In the above general formula (1), it is preferable that all of $R^1$ to $R^8$ groups represent hydrogen; all of a, b and p represent 1, and Z represents —CH(OH)—. Thus, in one of the preferred forms of the crosslinked polymer according to the present invention, the polymer has a quaternary ammonium salt structure derived from a diallyldimethylammonium salt and, in the above general formula (1), all of $R^1$ to $R^8$ are hydrogen atom, a, b and p are all equal to 1, and Z represents —CH(OH)—.

By virtue of its unique crosslink structure, the crosslinked polymer of the present invention may have a thermal degradation temperature not below 300° C., with the result that the elimination (thermal degradation) of its tertiary amine structure and quaternary ammonium salt structure, for instance, may be prevented. As a consequence, the crosslinked polymer is made fully serviceable within a broad temperature range over a protracted time period, thus being broadened in the scope of applicability.

The present invention further provides a method for producing a crosslinked polymer comprising a crosslinking step which comprises causing a crosslinking agent to act on a reactant solution containing a high molecular compound, said high molecular compound essentially has a repeating unit (3) represented by the following general formula (3):

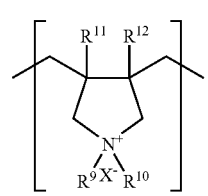

(3)

wherein $R^9$ and $R^{10}$ are the same or different and each represents an alkyl group containing 1 to 10 carbon atoms; $R^{11}$ and $R^{12}$ are the same or different and each represents a hydrogen atom, a halogen atom, a methyl group, or an ethyl group; $X^-$ represents a halide ion, a hydroxide ion, an organic acid anion, or an inorganic acid anion, and a repeating unit (4) represented by the following general formula (4):

(4)

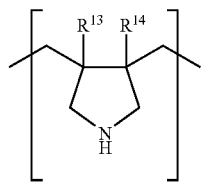

wherein $R^{13}$ and $R^{14}$ are the same or different and each represents a hydrogen atom, a halogen atom, a methyl group, or an ethyl group.

And said crosslinked polymer essentially has a repeating unit (2) represented by the following general formula (2):

(2)

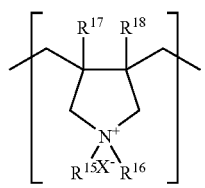

wherein $R^{15}$ and $R^{16}$ are the same or different and each represents an alkyl group containing 1 to 10 carbon atoms; $R^{17}$ and $R^{18}$ are the same or different and each represents a hydrogen atom, a halogen atom, a methyl group, or an ethyl-group; $X^-$ represents a halide ion, a hydroxide ion, an organic acid anion, or an inorganic acid anion, and a crosslink structure represented by the above general formula (1), and said method for producing a crosslinked polymer further comprises a step of suspending said high molecular compound in an inert organic solvent.

In accordance with the above production method, a crosslinked polymer having such excellent performance characteristics as mentioned above can be easily produced.

The method for producing a crosslinked polymer according to the present invention is a method comprising a step of causing a crosslinking agent to act on a reactant solution containing a high molecular compound to thereby synthesize the objective crosslinked polymer. In this specification, the above step is referred to as step (A).

The high molecular compound mentioned above is a compound having a repeating unit (3) represented by the above general formula (3) and a repeating unit (4) represented by the above general formula (4) as essential units. Such high molecular compounds can be used each alone or in a combination of two or more species.

Referring, further, to the above high molecular compound, the repeating unit (3) and repeating unit (4) may each be a single kind of unit or two or more kinds of units. Moreover, the mode of copolymerization of the repeating unit (3) and repeating unit (4) is not particularly restricted but includes random, alternate, and block, among others.

Referring to the above general formula (3), $R^9$ and $R^{10}$ are the same or different and each represents an alkyl group containing 1 to 10 carbon atoms. The alkyl group containing 1 to 10 carbon atoms may be the same as mentioned above for $R^1$, $R^2$, $R^3$ and $R_4$, although methyl is preferred.

$R^{11}$ and $R^{12}$ are the same or different and each represents a hydrogen or halogen atom or a methyl or ethyl group. Among them, methyl is preferred. The halogen atom may for example be chlorine, bromine or iodine.

$X^-$ represents a halide ion, a hydroxide ion, an organic acid anion, or an inorganic acid anion. The preferred halide ion is chloride ion, bromide ion or iodide ion. The organic acid anion or inorganic acid anion means an anion resulting from elimination of at least one hydrogen ion from an organic acid or inorganic acid. As the inorganic acid anion, for instance, there may be mentioned sulfate, phosphonate, borate, cyanide, carbonate, hydrogen carbonate, thiocyanate, thiosulfonate, sulfite, hydrogen sulfite, nitrate, cyanate, phosphate, hydrogen phosphate, metalate (e.g. molybdate, tungstate, metavanadate, pyrovanadate, hydrogen pyrovanadate, niobate, tantalate, perrhenate, etc.), tetrafluoroaluminate, tetrafluoroborate, hexafluorophosphate and tetrachloroaluminate, $Al_2Cl_7^-$ ions and the like. As organic acid anions, there may be mentioned sulfonate, formate, oxalate, acetate, (meth)acrylate, trifluoroacetate, trifluoromethanesulfonate and bis (trifluoromethanesulfonate)amide, $(CF_3SO_2)_3Cl^-$ anions and the like. $X^1$ is preferably $Cl^-$.

Referring to the above general formula (4), $R^{13}$ and $R^{14}$ are the same as $R^{11}$ and $R^{12}$ referred to above and $X^-$ is also the same as above. Thus, the preferred high molecular compound is such that, in the above general formula (3), $R^9$ and $R^{10}$ each represents a methyl group and $R^{11}$ and $R^{12}$ each represents a hydrogen atom, and, in the above general formula (4), $R^{13}$ and $R^{14}$ each represents a hydrogen atom.

The high molecular compound mentioned above is preferably a strongly basic copolymer, alkali neutralization products derived from a copolymer obtained by copolymerizing diallyldimethylammonium chloride (DADMAC) and diallylamine hydrochloride (DAAHC) (poly-DADMAC/DAAHC; hereinafter also referred to as "polydiallylamine derivative"). When the polydiallylamine derivative as the precursor of the high molecular compound is exclusively comprised of diallyldimethylammonium chloride and diallylamine hydrochloride, their molar ratio is more preferably 5:95 to 95:5. As to the alkali mentioned above, the inorganic alkali, for instance, is preferably sodium hydroxide, potassium hydroxide, or sodium carbonate, while the preferred organic alkali is tetramethylammonium hydroxide. In this case, the compound to constitute the repeating unit (3) is DADMAC and the compound to constitute the repeating unit (4) is DAAHC, although the compounds to constitute the repeating unit (3) and repeating unit (4), respectively, are not restricted to these specific compounds.

As the high molecular compound mentioned above, an alkali-neutralized copolymer produced by copolymerizing the monomer to constitute the essential repeating units and a monomer or monomers other than said essential constituent monomers may also be used. As preferred examples of said monomer or monomers other than the monomer to constitute the essential repeating units, there can be mentioned acrylamide, acrylic acid and maleic acid, among others. These may be used singly or two or more of them may be used in combination.

The ratio of occurrence of said repeating unit (3), repeating unit (4), and other constituent unit is not particularly restricted provided that the operation and result of the present invention can be materialized, and can be judiciously selected according to the desired performance, thermal degradation resistance and other requirements which depend on the object of use of the crosslinked polymer. For example, the combined proportion of occurrence of said repeating unit (3) and repeating unit (4) is preferably 50 to 100 mol % of the whole constituent unit of the high molecular compound. The more preferred proportion is 70 to 100 mol % and the still more preferred proportion is 90 to 100 mol %.

The method for producing said high molecular compound is not particularly restricted but the reaction conditions, for instance, can be judiciously established according to the species of monomers to be employed and other variables. The alkali-neutralized polydiallylamine derivative, for instance, can be generally prepared in the form of an aqueous solution by the method which comprises blending an aqueous solution of DADMAC with an aqueous solution of DAAHC, subjecting the mixture to copolymerization, and neutralizing the reaction product with an alkali.

The production method of the present invention comprises a step of suspending the above high molecular compound in an inert organic solvent. This step is referred to as step (B) as well. In the preferred mode of practicing this invention, the step (B) is first carried out and the step (A) is then carried out. For example, the preferred production protocol comprises preparing a reactant solution containing the high molecular compound in the first place, suspending this reactant solution in an inert organic solvent to prepare a suspension of particles, and finally carrying out a crosslinking reaction of the basic copolymer with a crosslinking agent.

A typical procedure for preparing a reactant solution containing said high molecular compound comprises dispersing and dissolving the high molecular compound in a solvent.

The solvent mentioned above may be any solvent that is capable of dissolving the high molecular compound and such that the resulting reactant solution containing the high molecular compound will not be miscible with the inert organic solvent, that is to say that the reactant solution may exist as suspended particles in said inert organic solvent. The preferred solvent is water; an aqueous solution of sodium hydroxide or the like; or a solvent mixture of water and a water-miscible organic solvent such as methyl alcohol. Furthermore, in the case of an alkali-neutralized polydiallylamine derivative, for instance, the aqueous solution prepared by blending said aqueous solution of DADMAC with said aqueous solution of DAAHC, subjecting the mixture to copolymerization reaction, and neutralizing the reaction product with an alkaline reagent can also be used as said reactant solution.

In the present invention, the viscosity of said reactant solution is preferably adjusted to not more than 2.0 Pa·s, whereby the reactant solution can be made easy to handle. If the viscosity exceeds 2.0 Pa·s, the excessive viscosity will make it difficult to transport and deliver the reactant solution with a pump or the like so that the solution may not be suitable for industrial use. The more preferred viscosity is not higher than $7.0 \times 10^{-1}$ Pa·s. As used in this specification, the term "viscosity" means the viscosity measured with a Type B viscometer at around the room temperature (20° C. to 30° C.).

Since the high molecular compound in the above reactant solution has been neutralized with an alkali, the pH of the solution usually exceeds 12. Therefore, after preparation of the said reactant solution, it is preferable to immediately carry out the crosslinking reaction or promptly adjust the pH to not more than 8.3. By bringing the reactant solution to pH 8.3 or less, the long-term stability and handleability of the solution can be improved. If the pH exceeds 8.3, the reactant solution tends to udnergo gelation during storage. The more prefered pH is not higher than 5.5.

The procedure of suspending the above reactant solution in an inert organic solvent to prepare a suspension of particles is preferably followed in the presence of a suspending agent.

As the preferred inert organic solvent, there may be mentioned saturated chain hydrocarbons such as pentane, (n–)hexane and heptane; alicyclic hydrocarbons such as ligroin and cyclohexane; aromatic hydrocarbons such as benzene, toluene and xylene; and so forth. These may be used singly or two or more of them may be used in combination. Among these, toluene is preferred.

The preferred suspending agent to be used in carrying out the suspension polymerization includes, among others, carboxylic acid glycerides, typically fatty acid glycerides such as glycerol palmitate, glycerol (mono)stearate, glycerol oleate and glycerol linoleate; sorbitan esters such as sorbitan monopalmitate, sorbitan monostearate and sorbitan monooleate; and so forth. These may be used singly or two or more of them may be used in combination.

Furthermore, for stably maintaining the suspension of particles in an inert organic solvent, the use of a precipitation inhibitor is preferred. As the preferred precipitation inhibitor, starch; gelatin; cellulose derivatives such as ethylcellulose; well-known precipitation inhibitor used for reversed phase suspension polimerization such as polyvinyl alcohol; and the like may also be used. These can be used singly or two or more of them in combination. Among them, ethylcellulose and polyvinyl alchol are more preferred.

The crosslinking agent for use in said step (A) need just be a reagent which is at least bifunctional, that is to say which has two or more sites reactive to the high molecular compound, and is usually a reagent which contributes to the formation of a crosslink structure together with the nitrogen atom of the high molecular compound, that is the nitrogen atom constituting a tertiary amine structure forming the crosslink structure, and/or the carbon atom attached either directly or indirectly to said nitrogen atom being utilized as at least one crosslinking point.

The preferred crosslinking agent includes, epoxy compounds such as epichlorohydrin and various diepoxy compounds; dichloro compounds such as 1,4-dichlorobutane and 1,2-bis(2-chloroethoxy)ethane; dibromo compounds such as 1,2-dibromobutane and 1,4-dibromobutane; dialdehyde compounds such as glyoxal and glutaraldehyde. These can be used singly or two or more of them in combination. It is possible to form a desirable crosslink structure by applying epichlorohydrin, among the crosslinking agents mentioned above by way of example, to the above-mentioned alkali-neutralized polydiallylamine derivative.

In the production method of the present invention, the levels of use of the crosslinking agent, inert organic solvent, suspending agent, precipitation stabilizer, etc. are not particularly restricted but can be freely selected. Moreover, the reaction temperature and other conditions for crosslinking reaction can also be judiciously selected according to the kind of crosslinking agent and the characteristics of the high molecular compound to be crosslinked, among other factors.

In the preferred mode of carrying out the method for producing said crosslinked polymer, the concentration of said high molecular compound is set over 20 mass % but not over 90 mass %.

The concentration of the high molecular compound in said reactant solution is very important as a factor determinative of the strength and performance characteristics, in particular ion exchanging capacity, of the crosslinked polymer finally obtained. More specifically, the higher the concentration of the high molecular compound is, the greater are the strength and ion exchange capacity of the crosslinked polymer that is obtainable. Therefore, this concentration is preferably as high as possible within the solubility limits of the high molecular compound in the above mentioned particular solvent used.

Regarding the procedure for adjusting the concentration of the high molecular compound in said reactant solution, the reactant solution may be concentrated to increase the concentration of the high molecular compound, for instance. The preferred method of concentrating the reactant solution includes the method which comprises concentrating the reactant solution by means of an evaporator or the like and the method which comprises concentrating the reactant solution suspended in an inert organic solvent by taking advantage of the phenomenon of azeotropic distillation of the solvent fraction of the reactant solution and the inert organic solvent, to mention just a few examples.

Referring, further, to the above methods of adjusting the concentration of the high molecular compound in the reactant solution, in the case where said high molecular compound is an alkali-neutralized polydiallylamine derivative, the raw-material forming the high molecular compound as supplied in the form of an aqueous solution of necessity is subject to limitation in concentration and the proportion of the high molecular compound in the resulting reactant solution is usually about 30 mass % at most on a solid basis. However, by concentrating the reactant solution by the above concentration technique, for instance, the concentration of the high molecular compound can be increased to about 50 mass % or even higher. Moreover, when the high molecular compound is prepared from a raw material solution containing the monomer or a solution of the precursor, a highly concentrated solution of the crosslinked polymer can be obtained by concentrating the raw material solution for said high molecular compound or the solution of the precursor of said high molecular compound by the above method in the first place and then preparing the high molecular compound.

In the present invention, the concentration of the high molecular compound in said reactant solution is preferably adjusted to more than 20 mass % through not more than 90 mass %. By this procedure, the apparent specific gravity of the crosslinked polymer obtainable by the crosslinking of said high molecular compound can be sufficiently increased so that a crosslinked polymer having high strength and large ion exchange capacity or high catalyst activity can be obtained. If it is not more than 20 mass %, the apparent specific gravity of the crosslinked polymer will not be increased sufficiently so that the ion exchange capacity, catalyst activity, and strength tend to be low. If the concentration exceeds 90 mass %, the viscosity of the reactant solution will be too high to facilitate granulation of the crosslinked polymer. The more preferred concentration is 30 to 70 mass % and the still more preferred concentration is 30 to 50 mass %.

The crosslinked polymer of the present invention has the repeating unit (2) of the above general formula (2) and the crosslink structure of the above general formula (1) as essential constituent moieties.

The crosslinked polymer formed may be comprised of a single species or two or more species.

Moreover, in the crosslinked polymer, the repeating unit represented by general formula (2) and the crosslink structure of general formula (1) may each be comprised represented by a single species or two or more species.

Referring to the above general formula (2), $R^{15}$ and $R^{16}$ are the same as $R^9$ and $R^{10}$ referred to above; $R^{17}$ and $R^{18}$ are the same as $R^{11}$ and $R^{12}$ referred to above; and $X^-$ is also the same as defined above.

The above repeating unit (2), which is derived from the repeating unit (3) of said high molecular compound, has a cyclic quaternary ammonium salt structure and its nitrogen cation exhibits an ion exchange function or catalyst activity. Furthermore, since the mainchain, which constitutes a skeleton of the crosslinked polymer, is thus comprised of cyclic structures, the quaternary ammonium salt structure of the repeating unit (2) is least liable to be eliminated even at high temperature, thus contributing to an increased resistance to thermal degradation.

The crosslink structure represented by the above general formula (1) is the structure formed as the secondary amine of the repeating unit (4) in the high molecular compound reacts with the crosslinking agent.

The amount of occurrence of said repeating unit of formula (2) and crosslink structure represented by general formula (1) in the crosslinked polymer are not particularly restricted provided that the operation and result of the present invention are not compromised, and can be freely selected according to the desired properties and thermal degradation resistance, among other factors, of the crosslinked polymer. For example, the amount of occurrence of said repeating unit (2) and said crosslink structure represented by general formula (1) preferably accounts for 50 to 100 mol % of the total constituent unit of the crosslinked polymer. The more preferred amount is 70 to 100 mol % and the still more preferred amount is 90 to 100 mol %.

Provided that the operation and result of the present invention can be materialized, said crosslinked polymer may contain one or more other constituent unit (s) in addition to the essential units. As an example of the other constituent unit than the essential units, the repeating unit (4) which has not taken part in the formation of a crosslink structure can be mentioned. The repeating unit (4) mentioned just above has a secondary amine structure and the nitrogen atom of this secondary amine structure also exhibits the ion exchange capacity and catalyst activity as well.

In the method for producing a crosslinked polymer according to the present invention, the repeating unit (4) in said high molecular compound is crosslinked by the crosslinking agent to form a crosslink structure (1) and the nitrogen atom of the tertiary amine structure in this crosslink structure exhibits ion exchange property and catalyst activity. At the same time, such tertiary amine structures form a crosslink structure to provide a structure which is chemically resistant to thermal degradation and accordingly enables production of a crosslinked polymer having a high resistance to thermal degradation. Furthermore, because the repeating unit (2) in the crosslinked polymer, which is derived from the repeating unit (3) of the high molecular compound, has a quaternary ammonium salt structure, it performs ion exchange and catalyst functions and, at the same time, such quaternary ammonium salt structures make the main chain of the crossliked polymer comprised of cyclic structures, thus providing a structure chemically resistant to thermal degradation. In addition, even when the repeating unit (4) of the high molecular compound is partially not crosslinked but remains intact in the crosslinked polymer, the repeating unit of the crosslinked polymer as derived from said repeating unit (4) assumes a secondary amine structure capable of exhibiting ion exchange and catalyst properties and, at the same time, such secondary amine structures make the main chain of the crosslinked polymer comprised of cyclic structures which are chemically resistant to thermal degradation. Therefore, the crosslinked polymer obtainable by the production method of the present invention may have an increased number of active sites contributory to ion exchange and catalyst functions and the chemical structures forming these active sites are structurally resistant to thermal degradation, with the result that the crosslinked polymer may have a high ion exchange capacity, high catalyst activity, and good resistance to thermal degradation and, as such, can be used in a variety of applications.

In the method for producing a crosslinked polymer according to the present invention, the molecular weight of said high molecular compound is preferably not less than 500.

Even under the above conditions, a crosslinked polymer having a high ion exchange capacity, high catalyst activity, and good resistance to thermal degradation, thus being useful for a variety of applications, can be produced.

In the above production method, by controlling the molecular weight of the high molecular compound at a value not less than 500, the apparent specific gravity of the crosslinked polymer can be sufficiently increased so that a crosslinked polymer having high strength, a large ion exchange capacity, and high catalyst activity can be obtained. If the molecular weight of the crosslinked polymer is less than 500, the apparent specific gravity of the crosslinked polymer may not be sufficiently increased so that the ion exchange capacity, catalyst activity, and strength will not be as high as desired. The more preferred molecular weight is not less than 10,000 and not more than 500,000, and the still more preferred molecular weight is not less than 100,000 and not more than 300,000.

In the above method for producing a crosslinked polymer, the molar ratio of said repeating unit (3) to said repeating unit (4) in said high molecular compound is also preferably $99/1$ to $0/100$. Under these conditions, too, a crosslinked polymer having a high ion exchange capacity, high catalyst activity, and high thermal degradation resistance and therefore being suited for a broad range of application can be easily produced.

In the above production method, by controlling the molar ratio of the repeating unit (3) to repeating unit (4) in the high molecular compound within the above-mentioned range, the apparent specific gravity of the crosslinked polymer can be sufficiently increased so that a crosslinked polymer having high strength, a large ion exchange capacity, and high catalyst activity can be obtained. If the molar ratio of said repeating unit (3) to said repeating unit (4) exceeds $99/1$, the crosslink structure in the crosslinked polymer will be too sparse to provide a sufficiently high apparent specific gravity so that the ion exchange capacity, catalyst activity and strength may become insufficient. The more preferred molar ratio is not more than $95/5$, still more preferably not less than $50/50$, further more preferably not more than $90/10$, still more preferably not less than $70/30$.

It should be understood that the preferred range of molar ratio mentioned above is relevant to the high molecular compound exclusively comprising the above-mentioned two kinds of structural units.

The term "strength" as used herein means the physical strength such as, for example, crushing strength and resistance to cracking on sudden swelling with a solvent.

The method for producing a crosslinked polymer according to the present invention may include any step in addition to the steps described above provided that the operation and result of the invention are not thereby compromised.

For example, the method may comprise a step in which the crosslinked polymer obtained by said steps (A) and (B) or said step (A) is washed with a polar solvent in which an inorganic salt is soluble. The method for producing a crosslinked polymer may comprise a step in which the crosslinked polymer crosslinked by reacting a crosslinking agent is washed with a polar solvent. By this procedure, a crosslinked polymer having still higher ion exchange and catalyst functions and greater strength can be obtained. The "inorganic salts" mentioned above mean inorganic salts formed upon neutralization, with an alkali, of the diallylamine hydrochloride moiety contained in the polydiallylamine derivative. For example, when the alkali neutralization is carried out using sodium hydroxide (NaOH), sodium chloride (NaCl) is the inorganic salt.

The polar solvent to be used in washing the crosslinked polymer depends on the inorganic salt species. Generally, however, it preferably includes water; hydrophilic alcohols such as methyl alcohol and glycerol; dimethylformamide; dimethylacetamide; dimethyl sulfoxide; N-methylpyrrolidone; and so on. These may be used singly or two or more species in combination. For example, when the inorganic salt is NaCl, water, glycerol, methyl alcohol and the like are preferred as the polar solvent and, among them, water is most preferred from the solubility viewpoint.

The present invention further provides a method for producing a crosslinked polymer comprising a step for suspension-polymerizing a monomer component comprising a monomer represented by the following general formula (5):

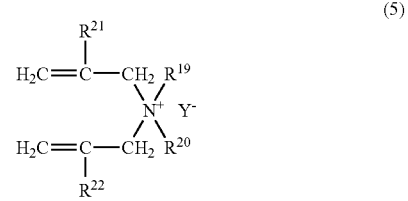

(5)

wherein $R^{19}$ and $R^{20}$ are the same or different and each represents an alkyl group containing 1 to 10 carbon atoms; $R^{21}$ and $R^{22}$ are the same or different and each represents a hydrogen atom, a halogen atom, a methyl group, or an ethyl group; $Y^-$ represents a halide ion, a hydroxide ion, an organic acid anion, or an inorganic acid anion, and a monomer represented by the following general formula (6):

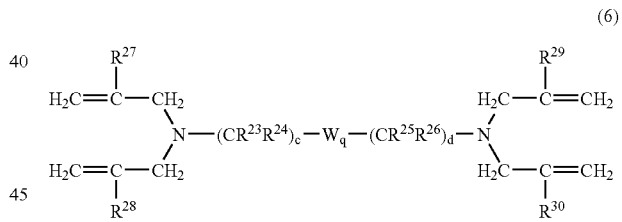

(6)

wherein $R^{23}$, $R^{24}$, $R^{25}$ and $R^{26}$ are the same or different and each represents a hydrogen atom, a halogen atom, an alkyl group containing 1 to 10 carbon atoms, or a hydroxyl group; $R^{27}$, $R^{28}$, $R^{29}$ and $R^{30}$ are the same or different and each represents a hydrogen atom, a halogen atom, a methyl group, or an ethyl group; c and d are the same or different and each represents an integer of 0 to 10; q represents 0 or 1; with the proviso that the relation $c+d+q \geq 1$ is satisfied; W represents —NH—, —N(CH$_3$)—, 1,4—piperazinylene, —NH—(CH$_2$)$_3$—NH—, —NH—(CH$_2$)$_4$—NH—, —O—, —O—(CH$_2$)$_2$—O——O—CH$_2$—C(CH$_3$)$_2$—CH$_2$—O—, —O—(CH$_2$)$_2$—(O—CH$_2$—CH$_2$)$_{n2}$—O—, 3-methyl—2,6-pyridyl, 4-methyl-2,6-pyridyl, 2,6-pyridyl, 2,5-pyridyl, or —CH(OH)—; n2 represents an integer of not less than 0.

By such a production method, too, there can be obtained a crosslinked polymer like the one described above, that is a spherical (pearl-like) crosslinked polymer which is highly resistant to heat, capable of exhibiting a high treating capacity as a resin catalyst, and having the desired particle size.

The monomer represented by the above general formula (5) is a compound having two diallylamino groups within one and the same molecule, that is a nitrogen-containing crosslinking agent contributory to formation of-a tertiary amine structure.

The nitrogen-containing crosslinking agent mentioned just above is a compound having at least two diallylamino groups within one and the same molecule. Thus, N,N,N',N'-tetraallyl-1,4-diaminobutane and N,N,N',N'-tetraallyldiaminoethane are preferred.

For the production of said compound having at least two diallylamino groups within the molecule, the method for tetraallylation of a diamine is suitable.

The preferred diamine includes such as 1,2-diaminopropane, 1,3-diaminopropane, 1,2-diaminobutane, 1,4-diaminobutane, 1,9-nonanediamine, iminobispropylamine, methyliminobispropylamine, N,N'-bis(aminopropyl)-1,3-propylenediamine, N,N'-bis(aminopropyl)-1,4-butylenediamine, bis(3-aminopropyl) ether, 1,2-bis(3-aminopropoxy)ethane, 1,3-bis(3-aminopropyl)-2,2-dimethylpropane, α, ω)-bis(3-aminopropyl) polyethylene glycolether, bis(aminopropyl) piperazine, 2,3-diaminopyridine, 2,5-diaminopyridine, 2,6-diaminopyridine or 2,6-diamino-4-methylpyridine.

These monomers are not only contributory to formation of the polymer but also function as crosslinking agents interconnecting the polymers formed on the respective diallylamino group sides to give the crosslinked monomer of the present invention.

Where necessary, said monomer may further contain a copolymerizable monomer capable of copolymerizing with said monomer represented by general formula (5) and monomer represented by general formula (6) within the range not detracting from the performance of the product crosslinked polymer. The preferred examples of said copolymerizable monomer are styrene, ethylene and vinyl ethers, and one or more of them can be employed. The proportion of said copolymerizable monomer in the whole monomer is not particularly restricted.

The dispersion medium (solvent) for use in the suspension polymerization of said monomer is not particularly restricted but preferably includes water, toluene and cyclohexane. The level of-use of the dispersion medium is not particularly restricted, either.

The suspending agent for use in conducting said suspension polymerization is preferably a sorbitan esters, although the species and level of use of the ester can be judiciously selected and is not particularly restricted. Furthermore, in order that the suspended state of the monomer component may be maintained in a stable condition, a precipitation inhibitor such as gelatin, dextrin, polyvinyl alcohol, or the like can be employed.

For the suspension polymerization of said monomer, a polymerization initiator can be used. The polymerization initiator specifically includes, among others, peroxide initiators such as hydrogen peroxide, benzoyl peroxide and cumene hydroperoxide; azo compounds (azo initiators) such as 2,2'-azobis(isobutyronitrile) and 2,2'-azobis(2-amidinopropane) dihydrochloride; persulfate salts (persulfate initiators) such as ammonium persulfate, sodium persulfate and potassium persulfate; and like radical polymerization initiators. Azo initiators are preferred to persulfate initiators since the former do not leave sulfur, which may act as a catalyst poison in certain reactions. These may be used singly or two or more of them may be used in combination. In lieu of the above polymerization initiators, irradiation with radiations, electron beams, ultraviolet rays and the like may be employed. The polymerization initiators may be used in combination with the irradiation with such radiations, electron beams, ultraviolet rays or the like. The amount of the polymerization initiator is not particularly restricted.

The reaction temperature in carrying out the above suspension polymerization is not particularly restricted but may appropriately be selected according to the monomer component, the dispersion medium and other factors. The reaction time can appropriately be selected so that the above polymerization reaction may be complete, according to the reaction temperature, monomer component, polymerization initiator and dispersion medium, or the combination thereof, and the amounts thereof, among others. The reaction pressure is not particularly restricted but the reaction can be carried out at ordinary pressure (atmospheric pressure), under reduced pressure or under elevated pressure.

In cases where the crosslinked polymer obtained by the above production method is directly used as a resin catalyst, this crosslinked polymer is preferably one which is insoluble in the solvent and can, therefore, be easily separated.

In the crosslinked polymer produced by the method of the present invention, said tertiary amine structure and quaternary ammonium structure are a cyclic amine structure and a cyclic quaternary ammonium salt structure, respectively. This is one of the reasons why the thermal degradation resistance of the crosslinked polymer according to the present invention is high chemo-structurally. For use in a reaction for activation of active hydrogen, the catalyst is usually required to withstand the high reaction temperature. Since the crosslinked polymer of the present invention is so resistant to thermal degradation that it may exhibit satisfactory catalyst activity over a protracted time. Moreover, this crosslinked polymer contains crosslink structures and, therefore, in an ion exchange reaction or in a reaction for activation of active hydrogen, it does not elute into the reaction mixture.

Uses for the crosslinked polymer of the present invention are not particularly restricted but it can be used in a broad range of application. Among standard preferred uses are ion exchange resins, ion exchange fibers, ion exchange membranes, chromatographic stationary phases, membrane materials, solid base catalysts for syntheses, catalyst carriers, phase transfer catalysts, carriers for immobilization of enzymes, cells or bacteria, electrically conductive materials, antistatic agents, and gas adsorbents. The application of said ion exchange resins includes water treatment, water desalting and clarification, production of ultrapure water, treatment of radioactive waste water, purification (decolorization) of sugar syrups, separation and purification of amino acids, separation and purification of weakly acidic substances, concentration and recovery of metal ions, removal of radioactive ions/substances, removal-of silica, recovery of iodides, recovery of sugar syrups, purification of uranium, purification of formalin, and so forth. Furthermore, because it is a structurally novel crosslinked polymer having a high resistance to heat, this crosslinked polymer has a remarkably high resistance to radiations, not to speak of thermal resistance, so that it can be used with advantage in the treatment of hot water and radioactive waste water in the atomic power plant.

Because the crosslinked polymer of-the present invention is not only excellent in ion exchange capacity and catalyst activity but also highly resistant to thermal degradation, the thermal degradation temperature can be set at 300° C. or higher in such applications. Therefore, it can be used with advantage over a broad temperature range for a prolonged time, hence in a remarkably expanded range of application.

In addition, this crosslinked polymer is advantageous in that there is no appreciable elution of organic matter, nor is there any appreciable emission of a foreign odor, with the result that its utility value is high not only in applications at high temperatures but also in applications at room temperature.

The present invention further provides a method for using the crosslinked polymer, wherein said crosslinked polymer is used in an ion exchange reaction.

The present invention further provides a method for using the crosslinked polymer, wherein said crosslinked polymer is used as an activation catalyst for the activation of active hydrogen in an active hydrogen-containing compound.

The present invention further provides a method for using the crosslinked polymer, wherein said crosslinked polymer is used in hot water treatment, production of ultrapure water, treatment of radioactive waste water, decolorization, or gas adsorption, or as a solid basic catalyst.

An embodiment of carrying out the above reaction process is not particularly restricted and may be selected according to the reaction to be carried out. The above crosslinked polymer as a catalyst to be used in the present invention can be formed in various shapes and sizes by the known methods. For significantly effecting a function as a catalyst, the polymer is preferably a particle having the size of 100 μm to 10 mm, and if necessary may be used in the shape of agglomerate, powder, fiber or membrane.

Further, the reaction in which said crosslinked polymer is used can be carried out using a stirrer batch reactor or a fixed or fluidized bed reactor, and as the reaction type, any of batch type and continuous type can be adopted. Furthermore, said reactor can be used in both said catalytic reaction and the distillation capable of efficiently purifying the products obtainable by said reaction, thus the way of using those is not limited by any process.

In order that the operation and result of the present invention may be sufficiently expressed in the application of said crosslinked polymer as an ion exchange resin, the apparent specific gravity of the crosslinked polymer is preferably controlled at not less than 0.05 g/mL, more preferably not less than 0.10 g/mL, still more preferably not less than 0.20 g/mL. On the other hand, when said crosslinked polymer is to be used as a resin catalyst, its apparent specific gravity is preferably controlled at not less than 0.05 g/mL. When the crosslinekd polymer is to be used as a catalyst for a suspension fluidized bed process, a higher apparent specific gravity is conducive to a greater mass of charge so that the reaction time can be as much curtailed. The more preferred apparent specific gravity is not less than 0.10 g/mL and the still more preferred apparent specific gravity is not less than 0.20 g/mL. In the present invention, such variables as the concentration and molecular weight of the starting material, pH and viscosity of the reactant solution, etc. can be judiciously selected to bring the apparent specific gravity of the product crosslinked polymer into the above-defined range.

The ion exchange reaction referred to above means an anion exchange reaction. In the case of the crosslinked polymer according to the present invention, the tertiary amine structure or quaternary ammonium structure present within the molecule function as ion exchange group and the hydroxide ion, halide ion, organic acid anion or inorganic acid anion of these ion exchange group undergo exchange with other anion. The organic acid anion or inorganic acid anion referred to above means the anion generated as a hydrogen ion leaves from an organic acid or an inorganic acid.

The reaction for the activation of active hydrogen means the abstraction or facilitation of dissociation of active hydrogen from an active hydrogen-containing compound by the nitrogen atom of a tertiary amine or quaternary ammonium salt structure, stated differently activation of the active hydrogen atom of the compound. The above crosslinked polymer can be used with advantage in various reactions involving nucleophilic addition through abstraction or facilitation of dissociation of active hydrogen from active hydrogen-containing compounds, that is to say those reactions involving activation of active hydrogen atoms.

The active hydrogen means a hydrogen atom to be involved in a desired reaction among all the hydrogen atoms that a compound has. Therefore, the active hydrogen is preferably higher in reactivity than hydrogen atoms directly bonded to carbon atoms in a hetero atom-free organic compounds.

The hydrogen atom mentioned just above includes the hydrogen atom directly attached to a hetero atom, as it is the case with —$NH_2$, —CONH, —OH, —SH, and other groups, and the hydrogen atom (α-hydrogen atom) attached to a carbon atom adjacent to an electron-withdrawing group, such as the hydrogen atom in the α-position of a carbonyl compound, a hydrogen atom constituting a substituted aromatic group; and a hydrogen atom constituting a functional group such as that of an aldehyde or carboxylic-acid, among others.

Among various active hydrogen-containing compounds to which the crosslinked polymer of the present invention can be applied, unsaturated carboxylic acids are preferred and (meth)acrylic acid is the most suited. Said active hydrogen-containing compound may have two or more active hydrogen atoms, in which case the mode of binding of active hydrogen may be all uniform or varying.

Referring to the reaction for activation of active hydrogen using said crosslinked polymer as a resin catalyst, the crosslinked polymer can be used with advantage in the following reactions. In the reaction examples (reaction schemes) presented below, R, R' and R" are the same or different and each represents a hydrogen atom or an alkyl group; Ar represents an aryl group; X represents a halogen atom; A represents an oxygen atom (O), a sulfur atom (S), or —NH.

The reaction in which a hydrogen directly bonded to a hetero atom is involved includes the following reaction examples described under (1) to (14), among others.

(1) Addition of a cyclic hetero compound (e.g. ethylene oxide, ethylenimine, ethylene sulfide, etc.) to an amine (primary or secondary amine).

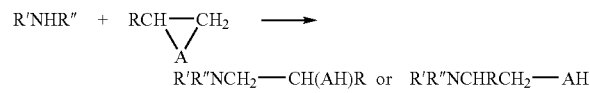

(2) Conversion of an amine (primary or secondary amine) to an amide.

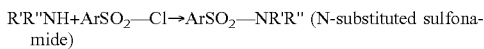

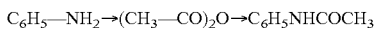

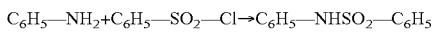

$C_2H_5-(CH_3)NH+p-CH_3-C_6H_4-SO_2-Cl \rightarrow p-CH_3-C_6H_4-SO_2-N(CH_3)C_2H_5$ (3) Hydrolysis of an amide.

$RCONH_2+H_2O \rightarrow RCOO^- + NH_4^+$ (4) Addition of a cyclic hetero compound to an amide, e.g. addition of ethylene oxide to pyrrolidone or isocyanuric acid.

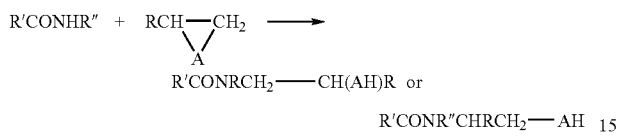

(5) Addition of a cyclic hetero compound to a thioamide.

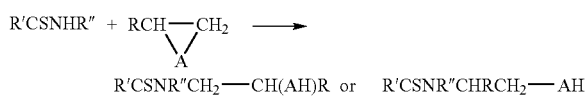

(6) Addition of a cyclic hetero compound to water or an alcohol (primary, secondary or tertiary alcohol), e.g. addition of an oxirane compound, such as ethylene oxide or propylene oxide, to water, methanol, ethanol, propanol or butanol.

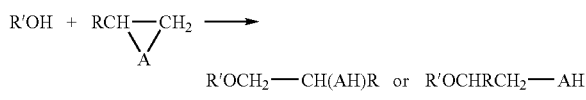

(7) Reaction between an alcohol (primary, secondary or tertiary alcohol) and a hydrogen halide, e.g. reaction for synthesizing isopropyl bromide from isopropyl alcohol and concentrated hydrogen bromide.

$ROH+HX \rightarrow RX+H_2O$ $(CH_3)_2CHOH+HBr \rightarrow (CH_3)_2CHBr+H_2O$ (8) Ester synthesizing reaction using an alcohol (primary, secondary or tertiary alcohl).

$(ROH+p-CH_3-C_6H_4-SO_2-Cl$ (p-toluenesulfonyl chloride)$\rightarrow p-CH_3-C_6H_4-SO_2-OR$ (alkyl tosylate)

$ROH+R'COOH \rightarrow R'COOR+H_2O$ (9) Oxidation of an alcohol (primary, secondary or tertiary alcohol).

$R'CHOH+(½)O_2 \rightarrow RR'CO+H_2O$

(10) Addition of a cyclic hetero compound to a phenol (e.g. phenol, hydroquinone, bisphenol A, bisphenol F, bisphenol S, BHPF (bishydroxyphenylfluorene), dihydroxydiphenylmethane, etc.).

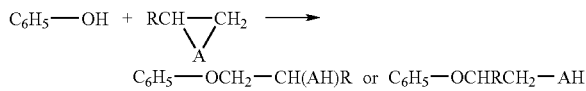

(11) Reaction for synthesizing ethers from a phenol and an alkyl halide (Williamson synthesis), e.g. reaction for synthesizing p-nitrobenzyl-p-tolyl ether from p-cresol and p-nitrobenzyl bromide.

$C_6H_5-OH+RX \rightarrow C_6H_5OR$ p-$CH_3-C_6H_4OH$ (p-cresol)+p-$BrCH_2-C_6H_4-NO_2$ (p-nitrobenzyl bromide)$\rightarrow$p-$CH_3-C_6H_4-O-(p-CH_2-C_6H_4-NO_2)$ (p-nitrobenzyl-p-tolyl ether)

(12) Reaction for synthesizing esters using a phenol, e.g. reaction for synthesizing p-nitrophenyl acetate from p-nitrophenol and acetic anhydride or reaction for synthesizing o-bromophenyl-p-toluenesulfonate from o-bromophenol and p-toluenesulfonyl chloride.

$C_6H_5-OH+RCOCl \rightarrow RCOOC_6H_5$ p-$NO_2-C_6H_4-OH$ (p-nitrophenol)+$(CH_3-CO)_2O$ (acetic anhydride)$\rightarrow$p-$NO_2-C_6H_4-OCOCH_3$ (p-nitrophenyl acetate)

o-$Br-C_6H_4-OH$ (o-bromophenol)+p-$CH_3-C_6H_4-SO_2-Cl$ (p-toluenesulfonyl chloride)$\rightarrow$p-$CH_3-C_6H_4-SO_2-O-(o-Br-C_6H_4)$ (o-bromophenyl-p-toluenesulfonate)

(13) Addition of a cyclic hetero compound to a thiol (primary, secondary or tertiary thiol).

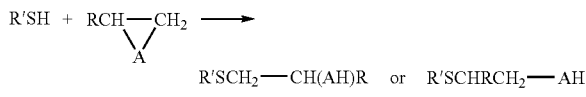

(14) Addition of a cyclic hetero compound to a thiophenol.

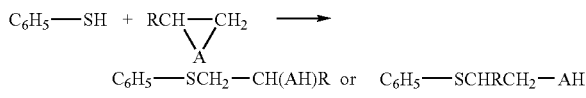

The reaction in which a hydrogen atom bonded to a carbon atom neighboring an electron-attracting group is involved includes the following reaction examples described under (1) to (8), among others. The reaction in which a hydrogen atom bonded to a carbon atom neighboring an electron-attracting group is not restricted to those reactions.

(1) Halogenation of a ketone, e.g. reaction for introducing a bromine atom into cyclohexanone.

$-CHCO-+X_2 \rightarrow -CXCO-+HX$ $C_5H_{10}C=O$ (cyclohexanone)+$Br_2 \rightarrow C_5H_9(Br)C=O+HBr$ (2) Aldol condensation, e.g. reaction for synthesizing 3-hydroxybutanal from acetaldehyde or reaction for synthesizing diacetone alcohol from acetone.

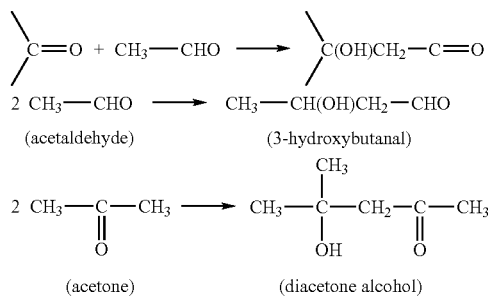

(3) Perkin condensation reaction.

$C_6H_4-CHO+(CH_3CO)_2O \rightarrow C_6H_5-CH=CHCOOH$ (4) Knoevenagel condensation reaction.

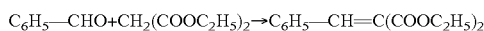

(5) Cope reaction.

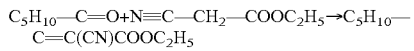

(6) Wittig reaction and other various nucleophilic addition to carbonyl compounds (ketones).

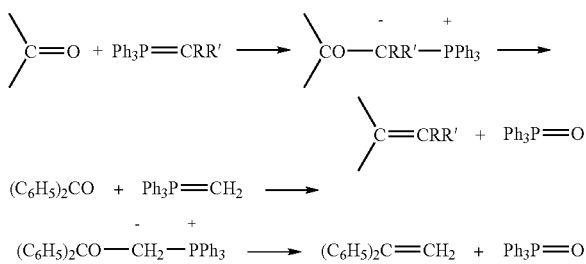

(7) Claisen condensation and other various nucleophilic acyl substitution reactions to ketones.

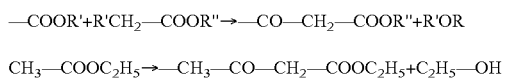

(8) Addition to an α, β-unsaturated carbonyl compound (ketone) (Michael addition).

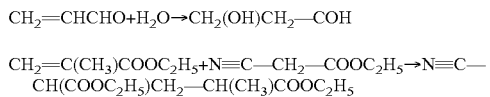

The reaction in which a hydrogen atom constituting a substituted aromatic group is involved includes the following reaction examples described under (1) and (2), among others. The reaction in which a hydrogen atom constituting a substituted aromatic group is involved is not restricted to those reactions.

(1) Reimer-Tiemann reaction.

(2) Friedel-Crafts acylation.

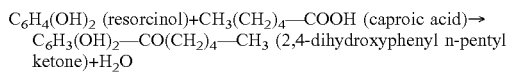

The reaction in which a hydrogen atom constituting the functional group of an aldehyde or carboxylic acid is involved includes the following reaction examples described under (1) to (4), among others. The reaction in which a hydrogen atom constituting the functional group of an aldehyde or carboxylic acid is involved is not restricted to those reactions.

(1) Addition of a cyclic hetero compound (e.g. ethylene oxide, propylene oxide, etc.) to a carboxylic acid (e.g. acrylic acid, methacrylic acid, acetic acid, propionic acid, etc.), e.g. reaction for synthesizing hydroxyethyl (meth) acrylate from (meth)acrylic acid and ethylene oxide or for synthesizing hydroxypropyl (meth)acrylate, which is known as a reaction of commercial importance.

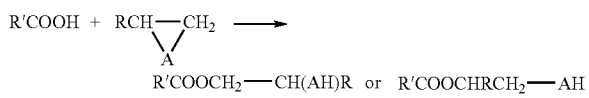

(2) Addition of a cyclic hetero compound to a thiocarboxylic acid.

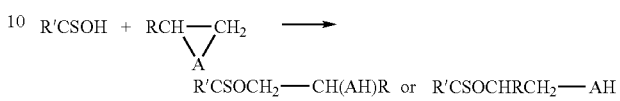

(3) Addition of an alcohol to an aldehyde.

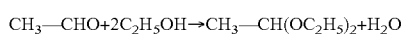

(4) Cannizzaro reaction, more specifically reaction for producing trimethylolpropane by two repetitions of aldol condensation of formaldehyde with n-butylformaldehyde followed by Cannizzaro reaction.

The above crosslinked polymer is more preferably used in the addition reaction of a cyclic hetero compound (preferably an oxirane compound, more preferably ethylene oxide or propylene oxide) or an aldehyde with at least one active hydrogen-containing compound selected from the group consisting of phenols, amides, water, alcohols, carboxylic acids, amides, malonic acid, cyanoacetic acid, and esters thereof; Mannich reaction; alkylation of aromatic compounds; hydroxyalkyl esterification of (meth)acrylic acid as described in Japanese Kokoku Publication Sho-41-13019; cyanohydrin formation reaction; cyanoethylation and the like among the above-mentioned reactions involving the activation of an active hydrogen of an active hydrogen-containing compound. The crosslinked polymer is more preferably used in reactions involving addition of an oxirane compound (particularly an ethylene oxide and propylene oxide) to an active hydrogen-containing compound (particularly suitable are water, alcohols containing 1 to 6 carbon atoms and (meth)acrylic acid) selected from the group consisting of water, alcohols, carboxylic acids and esters thereof, among the reactions mentioned above.

Having the constitution described above, the crosslinked polymer of the present invention has a large ion exchange capacity, high catalyst activity, and good resistance to thermal degradation and, therefore, can be used in a broad range of application, such as strong base anion exchange resins and resin catalysts. Furthermore, by the method for producing a crosslinked polymer according to the present invention, crosslinked polymers having the above-mentioned characteristics can be easily produced.

BEST MODES FOR CARRYING OUT THE INVENTION

The following examples are further illustrative but by no means definitive of the present invention. It should be understood that "%" stands for "mass %" unless otherwise specified.

EXAMPLE 1

An aqueous high molecular compound solution having a pH value of 12.5 was prepared by blending 2380 g of a 0.3% aqueous solution of NaOH containing 42% by volume (solids) of a linear high-molecular-weight copolymer consisting of diallyldimethylammonium chloride and diallylamine hydrochloride in a ratio (molar ratio) of approximately 70:30 and having a molecular weight of about 150,000 (precursor of high molecular compound) with 951 g of a 8.2% (by volume) aqueous solution of NaOH. In this aqueous high molecular compound solution, said linear high-molecular-weight copolymer had been neutralized by the alkali NaOH.

Then, a 20 L-vessel (made of SUS) equipped with a thermometer, MaxBlend impeller, and reflux condenser was charged with 10 L of the dispersion medium (inert organic solvent) toluene and 25.1 g each of sorbitan monopalmitate and ethyl-cellosolve as suspending agents. With the MaxBlend impeller being driven at a rotational speed of 120 rpm, the above high molecular compound solution was gently suspended (dispersed) in the dispersion medium and the suspension was incubated at 40° C. for 1 hour. Then, 90.8 g of the crosslinking agent epichlorohydrin was added dropwise over 1 hour, at the end of which time the temperature was increased to 90° C. and the reaction was conducted at this temperature for 4 hours.

Thereafter, the reaction mixture in the vessel was cooled and the toluene forming the upper layer was removed by decantation. Using 8 L of methyl alcohol (polar solvent), the remaining-reaction product was washed to give polymer beads. The washing was carried out by stirring 8 L of methyl alcohol containing the remaining present reaction product for 1 hour and removing the alcohol by decantation. This washing procedure was repeated for a total of 4 times. The product polymer beads were dried in vacuo at 60° C. two overnights and 907 g of the dried novel crosslinked polymer was recovered as crosslinked polymer A according to the present invention.

The crosslinked polymer A was a crosslinked polymer comprising the structure represented by the following formula (12) as the quaternary ammonium salt moiety and the structure represented by the following formula (13) as the crosslink site, with the two structures occurring in a theoretical ratio (molar ratio) of 70:15, that is ³⁰⁄₂.

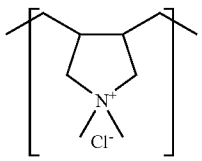
(12)

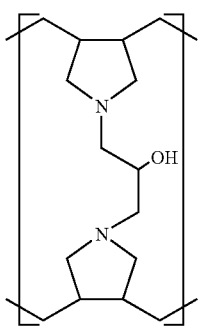
(13)

EXAMPLE 2

An aqueous high molecular compound solution having a pH value of 12.5 was prepared by blending 119.0 g of a 0.3% aqueous solution of NaOH containing 42% by volume (as solids) of a linear high-molecular-weight copolymer consisting of diallyldimethylammonium chloride and diallylamine hydrochloride in a ratio (molar ratio) of approximately 70:30 and having a molecular weight of about 150,000 (a precursor of high molecular compound) with 47.5 g of a 8.2% (by volume) aqueous solution of NaOH. In this aqueous high molecular compound solution, the linear high-molecular-weight copolymer had been neutralized with the alkali NaOH.

A 1 L-glass separable flask equipped with a thermometer, anchor-shaped stirring blade, and an oil/water separation pipe was charged with 500 mL of the dispersion medium (inert organic solvent) toluene and 1.25 g each of sorbitan monopalmitate as a suspending agent and ethylcellulose as a precipitation inhibitor. With the anchor-shaped stirring blade being driven at a rotational speed of 200 rpm, the above aqueous high molecular compound solution was gently added and suspended (dispersed) into the dispersion medium to prepare a suspension, which was then incubated at 40° C. for 30 minutes. Then, this suspension was heated to 90° C. and maintained at this temperature for 1 hour to remove 41 g of water azetropically with toluene to concentrate the aqueous high molecular compound solution in the suspension. The suspension was then cooled to 40° C. and 4.52 g of the crosslinking agent epichlorohydrin was added dropwise over 1 hour. The temperature was then increased to 90° C. and the reaction was conducted at this temperature for 4 hours.

Thereafter, the reaction mixture in the flask was cooled and filtered to separate the toluene phase from the water phase to give polymer beads. The product polymer beads were washed with 600 mL of methyl alcohol (polar solvent) for a total of 3 times and dried in vacuo at 60° C. overnight. The dry novel crosslinked polymer thus obtained, 46.0 g, was recovered as crosslinked polymer B according to the present invention.

EXAMPLE 3

The procedure of Example 2 was repeated to prepare polymer beads. These polymer beads were washed once with 600 mL of toluene and 3 times with 600 mL of water (polar solvent) and, then, dried in vacuo at 60° C. overnight to give crosslinked polymer C according to the present invention.

EXAMPLE 4

In a pressure-resistant glass bottle, 4.24 g of a 65% aqueous solution of diallyldimethylammonium chloride (monomer), 0.89 g of a 72% aqueous solution of N,N,N', N'-tetraallyldiaminobutane dihydrochloride (monomer, nitrogen-containing crosslinking agent), 44 mg of 2,2'-azobis(2-amidinopropane) dihydrochloride (azo initiator), and 0.29 g of water were blended and thoroughly dissolved. Then, this pressure-resistant glass bottle was heated at 55° C. for 4 hours and further at 75° C. for 2 hours to carry out the polymerization reaction of said monomers.

After completion of the polymerization reaction, the pressure-resistant glass bottle was cooled to recover the polymerization reaction product, which was then washed 3 times with 100 mL of methyl alcohol and dried in vacuo at 60° C. overnight. The dry novel crosslinked polymer, 3.5 g, was recovered as crosslinked polymer D according to the present invention.

The crosslinked polymer D was a crosslinked polymer having the structure represented by the above formula (12)

as the quaternary ammonium salt moiety and the structure represented by the following formula (14) as the crosslink site, with the theoretical ratio (molar ratio) of the two structures being 90:10 (the structure of general formula (12):the structure of general formula (14)).

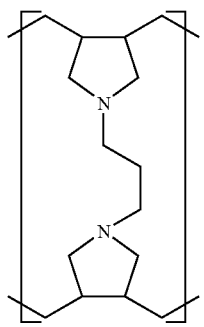

(14)

EXAMPLES 5 to 7

Using the crosslinked polymer A obtained in Example 1 as a sample, its thermal degradation temperature was measured by the method described hereinbefore. The thermal degradation temperatures of the crosslinked polymers C and D obtained in Examples 3 and 4, respectively, were also measured in the same manner. As a result, the thermal degradation temperature of crosslinked polymer A was found to be 390° C., that of crosslinked polymer C was found to be 386° C., and that of crosslinked polymer D was found to be 384° C.

COMPARATIVE EXAMPLE 1

The thermal degradation temperature of the commercial strong base anion exchange resin Amberlite IRA-400 (TM, Rohm & Haas Co.) was measured by the above method and found to be 290° C. It was, therefore, clear that compared with the commercial strong base anion exchange resin Amberlite IRA-400, the crosslinked polymers A, C and D obtained in Examples 1, 3 and 4 have higher thermal degradation temperatures and are, therefore, more resistant to thermal degradation.

EXAMPLE 8

Using the crosslinked polymer A obtained in Example 1 as an activation catalyst for activation of active hydrogen (α-hydrogen atom), the hydroxypropylation reaction of acrylic acid, an example of the reaction for adding a cyclic hetero compound to a carboxylic acid or an ester thereof, which is an active hydrogen-containing compound, was carried out.

Thus, a reaction vessel equipped with a thermometer, stirrer, etc. was charged with acrylic acid (carboxylic acid) and propylene oxide (cyclic hetero compound, oxirane compound) in an acrylic acid/propylene oxide charge ratio of 1.2 by mol.

Then, the crosslinked polymer A obtained in Example 1 was fed to the above reaction vessel at a level of 10% based on acrylic acid. Thereafter, with the reaction mixture being stirred, the reaction was continued at 70° C. for 4 hours for hydroxypropylation of acrylic acid.

After completion of the reaction, the reaction mixture was filtered and the recovered filtrate was analyzed by gas chromatography. As a result, the rate of conversion of acrylic acid was 75.0%, the selectivity for the adduct obtained by addition of one molecule of propylene oxide to one molecule of acrylic acid (reaction product: 2-hydroxypropyl acrylate (HPA)) was 86.7%, and the selectivity for the adduct obtained by addition of two molecules of propylene oxide to one molecule of acrylic acid (reaction byproduct: dipropylene glycol acrylate (DPGA)) was 9.6%. The rate of conversion of the substrate (acrylic acid) and the selectivity for each of the reaction product and byproduct was calculated by means of the following equation.

Conversion of substrate (%) =(number of mols of substrate consumed/number of mols of substrate fed)×100

Selectivity for reaction product (or byproduct)(%)= (number of mols of substrate converted to reaction product (or byproduct)/number of mols of substrate consumed)×100

The above results indicate that the crosslinked polymer A obtained in Example 1 is of use as an activation catalyst for the activation of active hydrogen (α-hydrogen, in particular) in the reaction for addition of a cyclic hetero compound to a carboxylic acid or an ester thereof.

EXAMPLE 9

Using the crosslinked polymer A obtained in Example 1 as an activation catalyst for the activation of active hydrogen (α-hydrogen), the hydroxyethylation reaction of acrylic acid was carried out as a typical reaction for addition of a cyclic hetero compound to a carboxylic acid or an ester thereof.

Thus, a reaction vessel equipped with a thermometer, stirrer, etc. was charged with 20 g of acrylic acid (carboxylic acid) and the crosslinked polymer A obtained in Example 1 was added at a level of 10% based on acrylic acid.

Then, the acrylic acid in the reaction vessel was heated to 70° C. under constant stirring, after which ethylene oxide (cyclic hetero compound or oxirane compound) was introduced into the vessel via a gas inlet pipe. This introduction of ethylene oxide was carried out continuously for 1.5 hours in such a manner that the final amount of charge would be 1.05 mols per mol of acrylic acid. Then, the reaction was further continued at 70° C. for 3.5 hours with constant stirring to effect hydroxyethylation of acrylic acid.

After completion of the reaction, the reaction mixture was filtered and the recovered filtrate was analyzed by gas chromatography. As a result, the rate of conversion of acrylic acid was 93.9%, the selectivity for the reaction product, 2-hydroxyethyl acrylate (HEA) was 88.0% and the selectivity for the reaction byproduct, diethylene glycol monoacrylate (DEGMA) was 4.0%. The conversion rate and selectivity were calculated in the same manner as in Example 8.

The above results indicate that the crosslinked polymer A obtained in Example 1 is of use as an activation catalyst for the activation of active hydrogen (α-hydrogen, in particular) in the reaction for addition of a cyclic hetero compound to a carboxylic acid or an ester thereof, which is an active hydrogen-containing compound.

EXAMPLES 10 to 12

Using the crosslinked polymer B obtained in Example 2, the hydroxypropylaion reaction of acrylic acid was carried out in the same manner as in Example 8. In addition, using each of the crosslinked polymers C and D obtained in Examples 3 and 4, respectively, as an activation catalyst, the hydroxypropylation of acrylic acid was also carried out. The results are collectively presented in Table 1. The conversion rate (% conversion of acrylic acid) and selectivity shown in Table 1 are as defined in Example 8.

TABLE 1

|  | Closslinked polymer | Conversion rate | Selectivity for HPA | Selectivity for DPGA |
|---|---|---|---|---|
| Example 10 | B | 70.2% | 85.8% | 11.2% |
| Example 11 | C | 69.6% | 84.8% | 11.6% |
| Example 12 | D | 75.5% | 87.8% | 9.5% |

EXAMPLE 10

The above results indicate that the crosslinked polymers B, C, and D obtained in Examples 2 to 4, respectively, are invariably of use as activation catalysts for the activation of active hydrogen (α-hydrogen, in particular) in the reaction for addition of a cyclic hetero compound to a carboxylic acid or an ester thereof.

Furthermore, microscopic observation of crosslinked polymer C after its use in the hydroxypropylation reaction of acrylic acid in Example 11 revealed substantially no cracks. This finding indicates that the crosslinked polymer C is a high-strength crosslinked polymer with a low risk for crack formation in the hydroxypropylation reaction of acrylic acid.

EXAMPLES 13 and 14

The anion exchange capacity of the crosslinked polymer A obtained in Example 1 was determined. This determination of anion exchange capacity was carried out by the routine technique for ion exchange capacity measurement. The anion exchange capacity of the crosslinked polymer C obtained in Example 3 was also determined in the same manner. As found by these measurements, the anion exchange capacity of crosslinekd polymer A was 0.80 meq/mL and that of crosslinked polymer C was 1.06 meq/mL (each based on swollen volume). The above results indicate that the crosslinked polymers A and C have anion exchange capacities.

EXAMPLE 15

Using the crosslinked polymer C obtained in Example 3, its crushing strength was measured. First, the crosslinked polymer C in the resin bead form was caused to swell sufficiently with water to prepare a water-saturated crosslinked polymer C. Then, a load was applied against one grain of crosslinked polymer C to record the magnitude of load that crushed the crosslinked polymer C. This procedure was repeated for a total of 20 grains of crosslinked polymer C and the average of 15 values to the exclusion of 5 highest and lowest load values was taken as the crushing strength (N/grain) . As a result, the crushing strength of crosslinked polymer C was found to be $4.9 \times 10^2$ N/grain.

EXAMPLE 16

An aqueous high molecular compound solution was prepared by blending 23.8 g of an aqueous solution containing 42% (solids) of a linear copolymer consisting of diallyldimethylammonium chloride and diallylamine hydrochloride in a content ratio (molar ratio) of about 70:30 and having a molecular weight of about 200,000 with 0.77 g of NaOH and 8.2 g of deionized water. In this aqueous high molecular compound solution, the diallylamine hydrochloride moiety of said linear high molecular copolymer had been neutralized by the alkali NaOH.

Then, a 200 mL glass separable flask equipped with a thermometer, lunate stirring blade, and a reflux condenser was charged with 100 mL of the dispersion medium (inert organic solvent) heptane and 1.0 g of the suspending agent sorbitan monooleate. With the lunate stirring blade being driven at 300 rpm, said aqueous high molecular compound solution was gently mixed and suspended (dispersed) into the dispersion medium and the suspension was maintained at 40° C. for one hour. Then, 0.91 g of the crosslinking agent epichlorohydrin was added dropwise over 1 hour, at the end of which time the temperature was increased to 90° C. and the reaction was carried out for 4 hours.

The reaction mixture in the vessel was then cooled and filtered to separate the dispersion medium from the product polymer beads. The polymer beads thus obtained were washed with 100 mL of methyl alcohol (polar solvent) for a total of 3 times and dried in vacuo at 60° C. to give 8.8 g of a dried novel crosslinked polymer as crosslinked polymer E according to the present invention.

This crosslinked polymer E is a crosslinked polymer having the structure represented by the above formula (12) as the quaternary ammonium salt moiety and the structure represented by the above formula (13) as the crosslink site, with the content ratio (molar ratio) of the two structures being theoretically 70:15, that is 3%½.

EXAMPLE 17

An aqueous high molecular compound solution was prepared by blending 79.3 g of an aqueous solution containing 42% (solids) of a linear copolymer (precursor polymer) comprising diallyldimethylammonium chloride and diallylamine hydrochloride in a content ratio (molar ratio) of about 70:30 and having a molecular weight of about 200,000 with 2.61 g of NaOH and 84.6 g of deionized water. In this aqueous high molecular compound solution, the diallylamine hydrochloride moiety of said linear copolymer had been neutralized by the alkali NaOH.

Then, a 1 L glass separable flask equipped with a thermometer, anchor-shaped stirring blade, and reflux condensor was charged with 500 mL of the dispersion medium (inert organic solvent) toluene, 1.25 g of the suspending agent sorbitan monopalmitate, and 1.25 g of the precipitation inhibitor ethylcellulose. With the anchor-shaped stirring blade being driven at 200 rpm, said aqueous high molecular compound solution was gently mixed and suspended (dispersed) into the dispersion medium and the resulting suspension was incubated at 40° C. for one hour. Then, 3.02 g of the crosslinking agent epichlorohydrin was added dropwise over 1 hour, at the end of which time the temperature was increased to 90° C. and the reaction was conducted for 4 hours.

Thereafter, the reaction mixture in the vessel was cooled and filtered to separate the dispersion medium from the product beads. The polymer beads thus obtained were washed with 600 mL of methyl alcohol (polar solvent) for a total of 3 times and dried in vacuo at 60° C. to give 31.1 g of a dried novel crosslinked polymer as crosslinked polymer F according to the present invention.

EXAMPLES 18 to 23

Under the production conditions indicated in Table 2, the procedure of Example 16 or 17 was otherwise repeated to give crosslinked polymers G to H according to the present invention. Example 18: crosslinked polymer G, Example 19: crosslinked polymer H, Example 20: crosslinked polymer I, Example 21: crosslinked polymer J, Example 22:

crosslinked polymer K, Example 23: crosslinked polymer L. The yields of crosslinked polymers G to L thus obtained are shown in Table 2.

TABLE 2

| | Example | | | | | | | |
|---|---|---|---|---|---|---|---|---|
| | 16 | 17 | 18 | 19 | 20 | 21 | 22 | 23 |
| Scale | Scale 200 mL | Scale 1L | Scale 1L | Scale 200 mL | Scale 200 mL | Scale 200 mL | Scale 200 mL | Scale 200 mL |
| Stirring | Lunate impeller, 300 rpm | Anchor impeller, 200 rpm | Anchor impeller, 200 rpm | Lunate impeller, 300 rpm | Lunate impeller, 300 rpm | Lunate impeller, 300 rpm | Lunate impeller, 300 rpm | Lunate impeller, 300 rpm |
| DADMAC/DAAHC ratio | 70/30 | 70/30 | 70/30 | 70/30 | 50/50 | 30/70 | 80/20 | 90/10 |
| Molecular weight | 200,000 | 200,000 | 200,000 | 100,000 | 110,000 | 130,000 | 180,000 | 220,000 |
| Concentration on nonvolatile matter basis | 42% | 42% | 42% | 42% | 41% | 40% | 41% | 44% |
| Aqueous polymer solution | 23.8 g | 79.3 g | 150.6 g | 24.4 g | 24.6 g | 25.2 g | 24.4 g | 22.7 g |
| NaCH | 0.77 g | 2.61 g | 4.95 g | 0.78 g | 0.77 g | 0.78 g | 0.51 g | 0.25 g |
| Water | 8.2 g | 84.6 g | 10.98 g | 8.2 g | 8.3 g | 7.5 g | 8.4 g | 10.4 g |
| Final concentration on nonvolatile matter basis | 30.5% | 20% | 38% | 30.0% | 30.0% | 30.1% | 30.0% | 30.0% |
| Dispersion medium | Heptane 100 mL | Toluene 500 mL | Toluene 500 mL | Heptane 100 mL | Heptane 100 mL | Heptane 100 mL | Toluene 100 mL | Toluene 100 mL |
| Suspending agent | SMO 1.0 g | SMP 1.25 g EC 1.25 g | SMP 1.25 g EC 1.25 g | SMO 0.9 g | SMO 1.0 g | SMO 1.0 g | SMP 0.25 g EC 0.25 g | SMP 0.25 g EC 0.25 g |
| Epichlorohydrin | 0.91 g | 3.02 g | 5.72 g | 0.92 g | 0.90 g | 0.92 g | 0.59 g | 0.30 g |
| Crosslinked polymer | E | F | G | H | I | J | K | L |
| Yield | 8.8 g | 31.1 g | 54.6 g | 9.0 g | 8.6 g | 8.8 g | 8.2 g | 7.6 g |

Descriptions in Table 2 are shown below.
(1) "DADMAC/DAAHC ratio" means the molar ratio of DADMAC to DAAHC in the high molecular copolymer (polydiallylamine derivative).
(2) "Molecular weight" means the molecular weight of the high molecular copolymer.
(3) "Concentration on nonvolatile matter basis" means the concentration of the high molecular copolymer in the aqueous solution.
(4) "Final concentration on nonvolatile matter basis" means the concentration of the high molecular copolymer in the aqueous solution immediately before crosslinking reaction.
(5) In dispersion medium, SMO stands for sorbitan monooleate, SMP stands for sorbitan monopalmitate, and EC stands for ethylcellulose.
(6) "Yield" means the mass of the dried crosslinked polymer producted.

EXAMPLE 24

Using the crosslinked polymer E obtained in Example 16 as an activation catalyst, the hydroxypropylation reaction of acrylic acid was carried out in otherwise the same manner as in Example 8.

Thus, a reaction vessel equipped with a thermometer, stirrer, etc. was charged with acrylic acid (carboxylic acid) and propylene oxide (cyclic hetero compound; oxirane compound) in a propylene oxide/acrylic acid charge ratio of 1.24 by mol.

Then, the crosslinked polymer E obtained in Example 16 was fed to the above reaction vessel at a level of 10% based on acrylic acid. Thereafter, the reaction was conducted at 70° C. with constant stirring for 4 hours to effect hydroxypropylation of acrylic acid.

After completion of the reaction, the reaction mixture was filtered and the filtrate was recovered and analyzed by gas chromatography. So analyzed, the rate of conversion of acrylic acid was 73.6%, the selectivity for 1:1 propylene oxide-acrylic acid adduct (reaction product: HPA) was 85.8%, and the selectivity for 2:1 propylene oxide-acrylic acid adduct (reaction byproduct: DPGA) was 10.4%. The above-mentioned conversion rate and selectivity are as defined in Example 8.

The above results indicate that the crosslinked polymer E obtained in Example 16 is of use as an activation catalyst for the activation of active hydrogen ($\alpha$-hydrogen, in particular) in the reaction for addition of a cyclic hetero compound to a carboxylic acid or an ester thereof. After the reaction, the apparent specific gravity of crosslinked polymer E in the reaction mixture was measured by the same technique as described above. The result was 0.139 g/mL.

EXAMPLES 25 to 31

Using each of the crosslinked polymers F, G, H, I, J, K and L obtained in Examples 17 to 23, respectively, as an activation catalyst, the hydroxypropylation reaction of acrylic acid was carried out in the same manner as in Example 8. The results are collectively presented in Table 3. The conversion rate (% conversion of acrylic acid) and selectivity shown in Table 3 are as defined in Example 8.

TABLE 3

| | Example | | | | | | | |
|---|---|---|---|---|---|---|---|---|
| | 24 | 25 | 26 | 27 | 28 | 29 | 30 | 31 |
| Crosslinked polymer | E | F | G | H | I | J | K | L |
| Conversion of acrylic acid | 73.6% | 78.0% | 61.9% | 72.5% | 72.0% | 71.4% | 79.9% | 86.2% |
| Selectivity for HPA | 85.8% | 88.8% | 80.6% | 85.7% | 85.2% | 84.3% | 88.1% | 90.2% |
| Selectivity for DPGA | 10.4% | 8.5% | 15.4% | 10.7% | 11.0% | 11.7% | 8.3% | 6.5% |
| Apparent specific gravity in reaction mixture | 0.139 g/mL | 0.100 g/mL | 0.165 g/mL | 0.129 g/mL | 0.121 g/mL | 0.113g/mL | 0.100 g/mL | 0.067 g/mL |

It is apparent from the above results that the crosslinked polymers F, G, H, I, J, K and L obtained in Examples 17 to 23, respectively, are invariably of use as activation catalysts in the reaction for addition of a cyclic hetero compound to a carboxylic acid or an ester thereof.

EXAMPLE 32

Using the crosslinked polymer E obtained in Example 16 as a sample, its thermal degradation temperature was measured by the method described above. As a result, the thermal degradation temperature of crosslinked polymer E was found to be 390° C.

COMPARATIVE EXAMPLE 2

The thermal degradation temperature of the commercial strong base anion exchange resin Amberlite IRA-400 is 290° C. It is, therefore, clear that compared with the commercial strong base anion exchange resin Amberlite IRA-40, the crosslinked polymer E obtained in Example 16 has a higher thermal degradation temperature, that is to say a higher resistance to thermal degradation.

EXAMPLE 33

Using the crosslinked polymer E obtained in Example 16, its anion exchange capacity was measured as in Example 13. As a result, the anion exchange capacity of crosslinked polymer E was found to be 0.80 meq/mL.(based on swollen volume). The above result indicates that the crosslinked polymer E has an anion exchange capacity.

The results obtained in Example 32, Comparative Example 2, and Example 33 are presented in Table 4.

TABLE 4

| | Example 32 | Comparative Example 2 | Comparative Example 33 |
|---|---|---|---|
| Crosslinked polymer | E | IRA-400 | E |
| Evaluation | Thermal decomposition temperature 390° C. | Thermal decomposition temperature 290° C. | Anion exchange capacity 0.80 meq./mL |

What is claimed is:

1. A crosslinked polymer having a tertiary amine and/or a quaternary ammonium salt structure, said crosslinked polymer has a tertiary amine structure at either end of at least one crosslink structure and essentially has a crosslink structure represented by the following general formula (1):

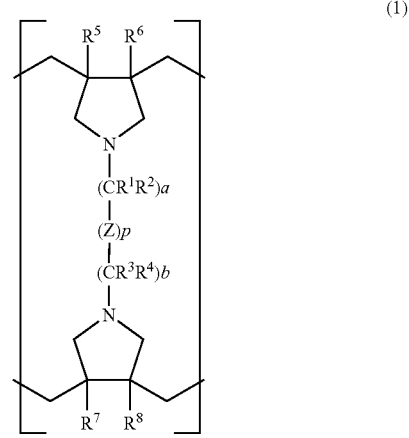

(1)

wherein $R^1$, $R^2$, $R^3$ and $R^4$ are the same or different and each represents a hydrogen atom, a halogen atom, an alkyl group containing 1 to 10 carbon atoms, or a hydroxyl group; $R^5$, $R^6$, $R^7$ and $R^8$ are the same or different and each represents a hydrogen atom, a halogen atom, a methyl group, or an ethyl group; a and b are the same or different and each represents an integer of 0 to 10; and p represents 0 or 1; with the proviso that the relation $a+b+p \geqq 1$ is satisfied; Z represents an —NH—, —N (CH$_3$)—, 1, 4-piperazinylene, —NH—(CH$_2$)$_3$—NH—, —NH—(CH$_2$)$_4$—NH—, —O—, —O—(CH$_2$)$_2$—O—, —O—CH$_2$—C (CH$_3$)$_2$—CH$_2$—O—, —O—(CH$_2$)$_2$—(O—CH$_2$—CH$_2$)$_{n1}$—O—, 3-methyl-2, 6-pyridyl, 4-methyl-2, 6-pyridyl, 2, 6-pyridyl, 2, 5-pyridyl, or —CH (OH)—: n1 represents an integer of not less than 0.

2. The crosslinked polymer according to claim 1 which has a quaternary ammonium salt structure derived from a diallyldimethylammonium salt.

3. The crosslinked polymer according to claim 1 which has a quaternary ammonium salt structure derived from a diallyldimethylammonium salt and, in the above general formula (1), all of $R^1$ to $R^8$ are hydrogen atoms, a, b and p are all equal to 1, and Z is —CH (OH)—.

* * * * *

UNITED STATES PATENT AND TRADEMARK OFFICE
CERTIFICATE OF CORRECTION

PATENT NO.          : 7,094,853 B2
APPLICATION NO.     : 10/283314
DATED               : August 22, 2006
INVENTOR(S)         : Yoshiaki Hirano et al.

It is certified that error appears in the above-identified patent and that said Letters Patent is hereby corrected as shown below:

Please insert the allowed and rejoined application claims 2 - 11, 13, 15, 17, and 19 as patent claims 4 - 17, respectively, as follows:

4. A crosslinked polymer having a tertiary amine and/or a quaternary ammonium salt structure, said crosslinked polymer has a tertiary amine structure at either end of at least one crosslink structure and essentially has a crosslink structure represented by the following general formula (1):

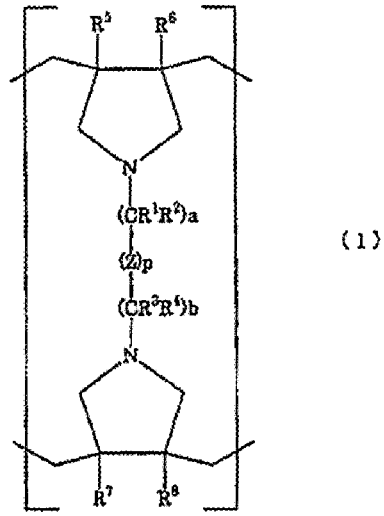

wherein $R^1$, $R^2$, $R^3$ and $R^4$ are the same or different and each represents a hydrogen atom, a halogen atom, an alkyl group containing 1 to 10 carbon atoms, or a hydroxyl group; $R^5$, $R^6$, $R^7$ and $R^8$ are the same or different and each represents a hydrogen atom, a halogen atom, a methyl group, or an ethyl group; a and b are the same or different and each represents an integer of 0 to 10; and p represents 0 or 1;

UNITED STATES PATENT AND TRADEMARK OFFICE
CERTIFICATE OF CORRECTION

| | | |
|---|---|---|
| PATENT NO. | : 7,094,853 B2 | Page 2 of 9 |
| APPLICATION NO. | : 10/283314 | |
| DATED | : August 22, 2006 | |
| INVENTOR(S) | : Yoshiaki Hirano et al. | |

It is certified that error appears in the above-identified patent and that said Letters Patent is hereby corrected as shown below:

with the proviso that the relation $a + b + p \geq 1$ is satisfied; Z represents an -NH-, -N $(CH_3)$-, 1, 4-piperazinylene, -NH- $(CH_2)_3$-NH-, -NH-$(CH_2)_4$-NH-, -O-, -O- $(CH_2)_2$-O-, -O-$CH_2$- C $(CH_3)_2$-$CH_2$-O-, -O- $(CH2)_2$- $(O-CH_2-CH_2)_{n1}$-O-, 3-methyl-2, 6-pyridyl, 4-methyl-2, 6-pyridyl, 2, 6-pyridyl, 2, 5-pyridyl, or -CH (OH) -:

n1 represents an integer of not less than 0.

5. The crosslinked polymer according to Claim 4 which has a quaternary ammonium salt structure derived from a diallyldimethylammonium salt.

6. The crosslinked polymer according to Claim 4 which has a quaternary ammonium salt structure derived from a diallyldimethylammonium salt and, in the above general formula (1), all of $R^1$ to $R^8$ are hydrogen atoms, a, b and p are all equal to 1, and Z is -CH (OH)-.

7. A method for producing a crosslinked polymer comprising a crosslinking step which comprises causing a crosslinking agent to act on a reactant solution containing a high molecular compound, said high molecular compound essentially has a repeating unit (3) represented by the following general formula (3):

UNITED STATES PATENT AND TRADEMARK OFFICE
CERTIFICATE OF CORRECTION

PATENT NO. : 7,094,853 B2
APPLICATION NO. : 10/283314
DATED : August 22, 2006
INVENTOR(S) : Yoshiaki Hirano et al.

It is certified that error appears in the above-identified patent and that said Letters Patent is hereby corrected as shown below:

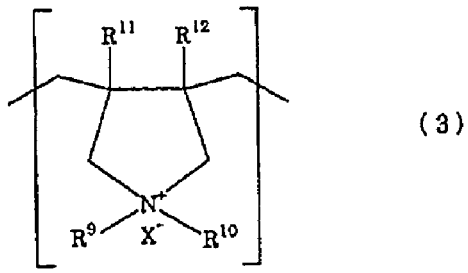

wherein $R^9$ and $R^{10}$ are the same or different and each represents an alkyl group containing 1 to 10 carbon atoms; $R^{11}$ and $R^{12}$ are the same or different and each represents a hydrogen atom, a halogen atom, a methyl group, or an ethyl group; $X^-$ represents a halide ion, a hydroxide ion, an organic acid anion, or an inorganic acid anion, and a repeating unit (4) represented by the following general formula (4):

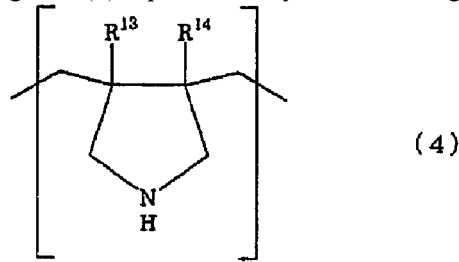

wherein $R^{13}$ and $R^{14}$ are the same or different and each represents a hydrogen atom, a halogen atom, a methyl group, or an ethyl group, said crosslinked polymer essentially has a repeating unit (2) represented by the following general formula (2):

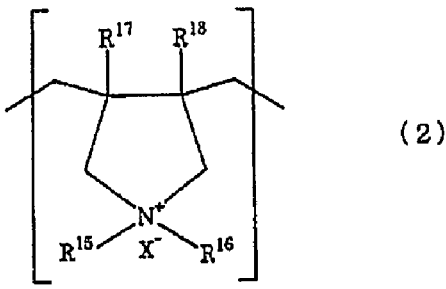

UNITED STATES PATENT AND TRADEMARK OFFICE
CERTIFICATE OF CORRECTION

| | | |
|---|---|---|
| PATENT NO. | : 7,094,853 B2 | Page 4 of 9 |
| APPLICATION NO. | : 10/283314 | |
| DATED | : August 22, 2006 | |
| INVENTOR(S) | : Yoshiaki Hirano et al. | |

It is certified that error appears in the above-identified patent and that said Letters Patent is hereby corrected as shown below:

wherein $R^{15}$ and $R^{16}$ are the same or different and each represents an alkyl group containing 1 to 10 carbon atoms; $R^{17}$ and $R^{18}$ are the same or different and each represents a hydrogen atom, a halogen atom, a methyl group, or an ethyl group; $X^-$ represents a halide ion, a hydroxide ion, an organic acid anion, or an inorganic acid anion, and a crosslink structure represented by the following general formula (1):

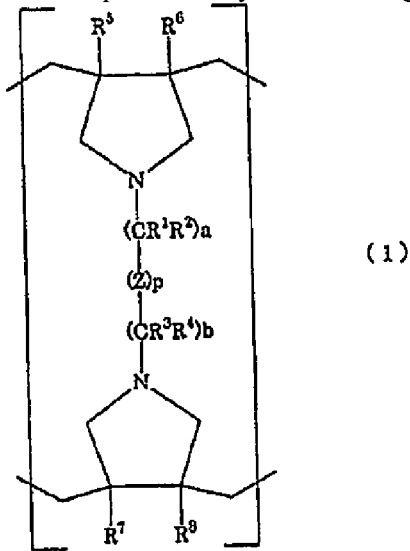

wherein $R^1$, $R^2$, $R^3$ and $R^4$ are the same or different and each represents a hydrogen atom, a halogen atom, an alkyl group containing 1 to 10 carbon atoms, or a hydroxyl group; $R^5$, $R^6$, $R^7$ and $R^8$ are the same or different and each represents a hydrogen atom, a halogen atom, a methyl group, or an ethyl group; a and b are the same or different and each represents an integer of 0 to 10; and p represents 0 or 1;

UNITED STATES PATENT AND TRADEMARK OFFICE
CERTIFICATE OF CORRECTION

PATENT NO. : 7,094,853 B2
APPLICATION NO. : 10/283314
DATED : August 22, 2006
INVENTOR(S) : Yoshiaki Hirano et al.

It is certified that error appears in the above-identified patent and that said Letters Patent is hereby corrected as shown below:

with the proviso that the relation $a + b + p \geq 1$ is satisfied; Z represents an -NH-, -N ($CH_3$)-, 1, 4-piperazinylene, -NH- ($CH_2$) $_3$-NH-, -NH-($CH_2$) $_4$-NH-, -O-, -O- ($CH_2$) $_2$-O-, -O-$CH_2^-$ C ($CH_3$) $_2$-$CH_2$-O-, -O- (CH2) $_2$- (O-$CH_2$ -$CH_2$) $_{n1}$-O-, 3-methyl-2, 6-pyridyl, 4-methyl-2, 6-pyridyl, 2, 6-pyridyl, 2, 5-pyridyl, or -CH (OH) -: n1 represents an integer of not less than 0, and said method for producing a crosslinked polymer further comprises a step of suspending said high molecular compound in an inert organic solvent.

8. The method for producing a crosslinked polymer according to Claim 7, wherein, in the above general formula (3), $R^9$ and $R^{10}$ each represents a methyl group and $R^{11}$ and $R^{12}$ each represents a hydrogen atom, and, in the above general formula (4), $R^{13}$ and $R^{14}$ each represents a hydrogen atom, in the high molecular compound.

9. The method for producing a crosslinked polymer according to Claim 7, wherein the concentration of the high molecular compound is set over 20 mass % but not over 90 mass %.

10. The method for producing a crosslinked polymer according to Claim 7, wherein the molecular weight of the high molecular compound is not less than 500.

UNITED STATES PATENT AND TRADEMARK OFFICE
CERTIFICATE OF CORRECTION

| PATENT NO. | : 7,094,853 B2 |
|---|---|
| APPLICATION NO. | : 10/283314 |
| DATED | : August 22, 2006 |
| INVENTOR(S) | : Yoshiaki Hirano et al. |

It is certified that error appears in the above-identified patent and that said Letters Patent is hereby corrected as shown below:

11. The method for producing a crosslinked polymer according to Claim 7, wherein the molar ratio of the repeating unit (3) to the repeating unit (4) in the high molecular compound is 99/1 to 0/100.

12. The method for producing a crosslinked polymer according to Claim 7 comprising a step in which the crosslinked polymer crosslinked by reacting a crosslinking agent is washed with a polar solvent.

13. A method for producing a crosslinked polymer comprising a step for suspension-polymerizing a monomer component comprising a monomer represented by the following general formula (5):

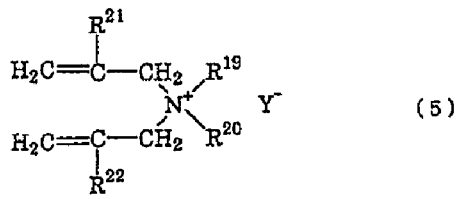

wherein $R^{19}$ and $R^{20}$ are the same or different and each represents an alkyl group containing 1 to 10 carbon atoms; $R^{21}$ and $R^{22}$ are the same or different and each represents a hydrogen atom, a halogen atom, a methyl group, or an ethyl group; $Y^-$ represents a halide ion, a hydroxide ion, an organic acid anion, or an inorganic acid anion, and a monomer represented by the following general formula (6):

UNITED STATES PATENT AND TRADEMARK OFFICE
CERTIFICATE OF CORRECTION

PATENT NO. : 7,094,853 B2
APPLICATION NO. : 10/283314
DATED : August 22, 2006
INVENTOR(S) : Yoshiaki Hirano et al.

It is certified that error appears in the above-identified patent and that said Letters Patent is hereby corrected as shown below:

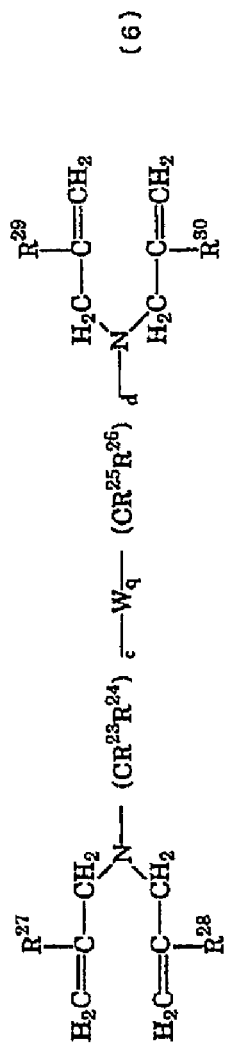

(6)

wherein $R^{23}$, $R^{24}$, $R^{25}$ and $R^{26}$ are the same or different and each represents a hydrogen atom, a halogen atom, an alkyl group containing 1 to 10 carbon atoms, or a hydroxyl group; $R^{27}$, $R^{28}$, $R^{29}$ and $R^{30}$ are the same or different and each represents a hydrogen atom, a halogen atom, a methyl group, or an ethyl group; c and d are the same or different and each represents an integer of 0 to 10; q represents 0 or 1;

UNITED STATES PATENT AND TRADEMARK OFFICE
CERTIFICATE OF CORRECTION

PATENT NO. : 7,094,853 B2
APPLICATION NO. : 10/283314
DATED : August 22, 2006
INVENTOR(S) : Yoshiaki Hirano et al.

It is certified that error appears in the above-identified patent and that said Letters Patent is hereby corrected as shown below:

with the proviso that the relation $c + d + q \geq 1$ is satisfied; W represents -NH-, -N ($CH_3$) -, 1, 4-piperazinylene, -NH- ($CH_2$) $_3$-NH-, -NH- ($CH_2$) $_4$-NH-, -O-, -O- ($CH_2$) $_2$-O-, -O-$CH_2$- C ($CH_3$) $_2$-$CH_2$-O-, -O- ($CH_2$) $_2$- (O-$CH_2$ -$CH_2$) $_{n2}$-O-, 3-methyl-2, 6- pyridyl, 4-methyl-2, 6-pyridyl, 2, 6-pyridyl, 2, 5-pyridyl, or -CH (OH) -: $n2$ represents an integer of not less than 0.

14. A method for using the crosslinked polymer according to Claim 4, wherein said crosslinked polymer is used in an ion exchange reaction.

15. A method for using the crosslinked polymer according to Claim 4, wherein said crosslinked polymer is used as an activation catalyst for the activation of active hydrogen in an active hydrogen-containing compound.

16. A method for using the crosslinked polymer according to Claim 4, wherein said corsslinked polymer is used as an activation catalyst for the activation of active hydrogen in an active hydrogen-containing compound, said active hydrogen-containing compound is a carboxylic acid or an ester thereof, and that said activation of active hydrogen in an active hydrogen-containing compound is performed in a reaction for addition of a cyclic hetero compound to said carboxylic acid or ester thereof.

UNITED STATES PATENT AND TRADEMARK OFFICE
CERTIFICATE OF CORRECTION

| | | |
|---|---|---|
| PATENT NO. | : 7,094,853 B2 | |
| APPLICATION NO. | : 10/283314 | |
| DATED | : August 22, 2006 | |
| INVENTOR(S) | : Yoshiaki Hirano et al. | |

It is certified that error appears in the above-identified patent and that said Letters Patent is hereby corrected as shown below:

17. A method for using the crosslinked polymer according to Claim 4, wherein said crosslinked polymer is used in hot water treatment, production of ultrapure water, treatment of radioactive waste water, decolorization, or gas adsorption, or as a solid basic catalyst.

Signed and Sealed this

Seventeenth Day of April, 2007

JON W. DUDAS
*Director of the United States Patent and Trademark Office*